United States Patent
Zhang et al.

(10) Patent No.: US 11,837,217 B2
(45) Date of Patent: Dec. 5, 2023

(54) MESSAGE PLAYING METHOD AND TERMINAL

(71) Applicant: HUAWEI TECHNOLOGIES CO., LTD., Shenzhen (CN)

(72) Inventors: Yue Zhang, Beijing (CN); Qiang Tao, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 521 days.

(21) Appl. No.: 17/257,547

(22) PCT Filed: Jul. 4, 2018

(86) PCT No.: PCT/CN2018/094517
§ 371 (c)(1),
(2) Date: Dec. 31, 2020

(87) PCT Pub. No.: WO2020/006711
PCT Pub. Date: Jan. 9, 2020

(65) Prior Publication Data
US 2021/0210068 A1 Jul. 8, 2021

(51) Int. Cl.
*G10L 15/22* (2006.01)
*G10L 13/04* (2013.01)
(Continued)

(52) U.S. Cl.
CPC .............. *G10L 13/04* (2013.01); *G10L 15/22* (2013.01); *G10L 15/26* (2013.01); *H04L 51/42* (2022.05); *G10L 2015/223* (2013.01)

(58) Field of Classification Search
CPC ......... G10L 13/04; G10L 15/22; G10L 15/26; G10L 2015/223; G10L 15/07;
(Continued)

(56) References Cited

U.S. PATENT DOCUMENTS 11,580,993 B2* 2/2023 Edara ...................... G10L 17/22
2014/0337028 A1* 11/2014 Wang ...................... G10L 17/22
704/251

(Continued)

FOREIGN PATENT DOCUMENTS

CN 101378530 A 3/2009
CN 101778154 A 7/2010
(Continued)

OTHER PUBLICATIONS

Wang Bingxi, Fundamentals of Practical Speech Recognition, 2005, 2 pages (with the Abstract and Translation only).
(Continued)

*Primary Examiner* — Huyen X Vo

(57) ABSTRACT

A message playing method includes: receiving a first message, and asking in a voice manner, whether to play the first message; if a first voice of a user does not match a keyword of a positive reply, continuing to detect a voice of the user; if a second voice of the user detected, matches the keyword of the positive reply, playing the first message in the voice manner, and recording a quantity of times of using a text corresponding to the first voice; and when the quantity of times of using the text that corresponds to the first voice and that is recorded is greater than a first threshold, adding the text to the keyword of the positive reply.

20 Claims, 20 Drawing Sheets

(51) Int. Cl.
G10L 15/26 (2006.01)
H04L 51/42 (2022.01)

(58) Field of Classification Search
CPC ... G10L 2015/088; G10L 15/08; H04L 51/42; H04L 51/226; H04L 51/04
See application file for complete search history.

(56) References Cited

U.S. PATENT DOCUMENTS

| | | |
|---|---|---|
| 2015/0073805 A1 | 3/2015 | Stern et al. |
| 2015/0161521 A1 | 6/2015 | Shah et al. |

FOREIGN PATENT DOCUMENTS

| | | |
|---|---|---|
| CN | 101800800 A | 8/2010 |
| CN | 103929537 A | 7/2014 |
| CN | 104159206 A | 11/2014 |
| CN | 104991894 A | 10/2015 |
| CN | 105245729 A | 1/2016 |
| CN | 105825856 A | 8/2016 |
| CN | 106156022 A | 11/2016 |
| CN | 106412282 A | 2/2017 |
| CN | 106506804 A | 3/2017 |
| CN | 106656732 A | 5/2017 |
| CN | 106899946 A | 6/2017 |
| CN | 107220292 A | 9/2017 |
| CN | 107360320 A | 11/2017 |
| CN | 107452373 A | 12/2017 |
| CN | 107612814 A | 1/2018 |
| CN | 107644640 A | 1/2018 |
| WO | 2018037956 A1 | 3/2018 |

OTHER PUBLICATIONS

Office Action issued in CN201880093445.5, dated Jul. 27, 2022, 11 pages.
Office Action dated Dec. 12, 2022 issued for Chinese Application No. 201880093445.5 (11 pages).
Rawan T. Khalil et al, "Mobile-Free Driving with Android Phones: System Design and Performance Evaluation", 2012—9th International Multi-Conference on Systems, Signals and Devices, Mar. 2012, XP032180228, 6 pages.
Office Action issued in CN 201880093445.5, dated Jun. 17, 2021, 12 pages.
Extended European Search Report issued in EP 18925355.2 dated May 4, 2021, 10 pages.
International Search Report and Written Opinion issued in PCT/CN2018/094517, dated Mar. 19, 2019, 10 pages.
Office Action issued in CN201880093445.5, dated Apr. 6, 2023, 14 pages.

* cited by examiner

TO

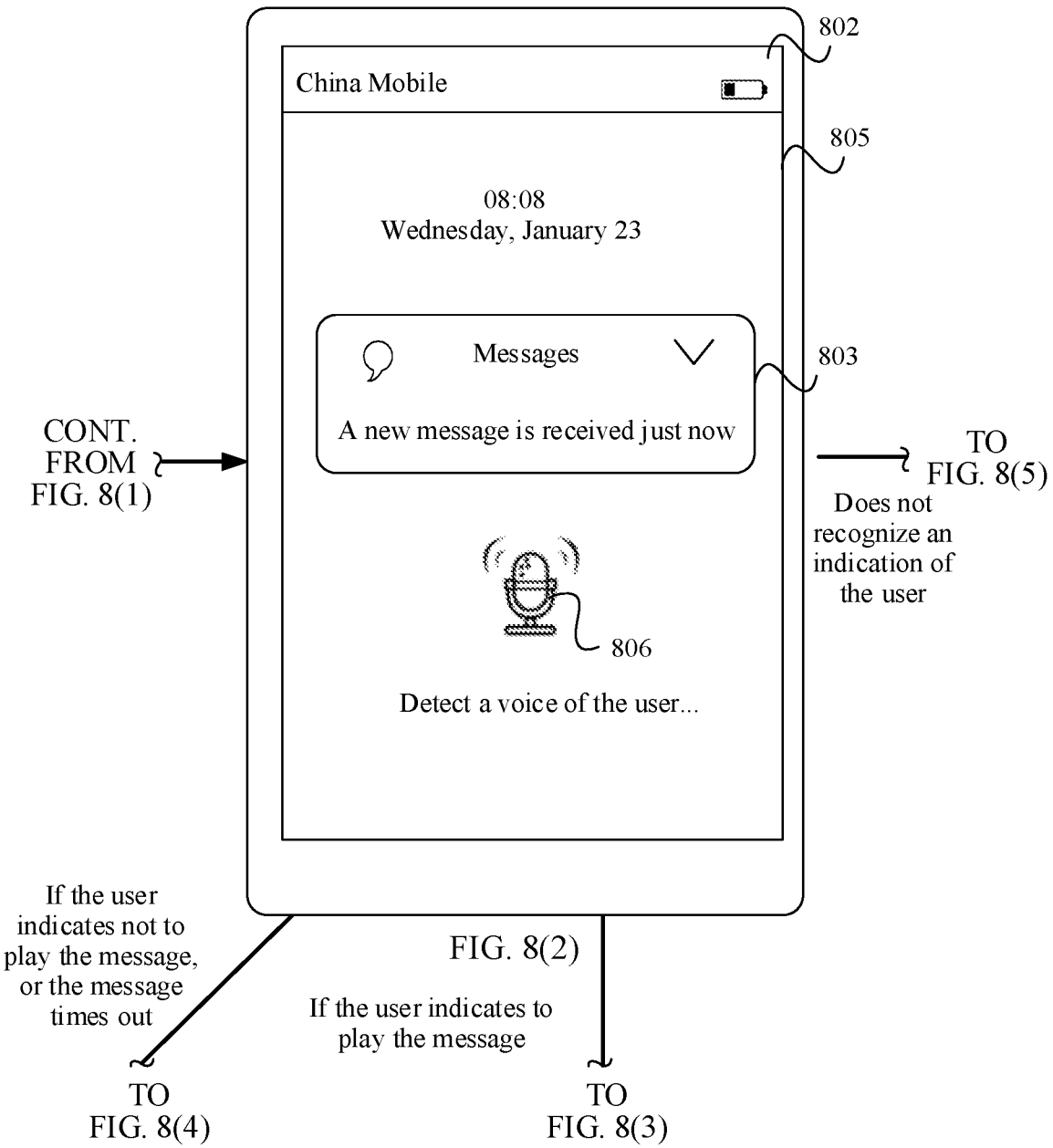

US 11,837,217 B2

MESSAGE PLAYING METHOD AND TERMINAL

CROSS-REFERENCE TO RELATED APPLICATIONS

This application is a National Stage Of International Application No. PCT/CN2018/094517, filed on Jul. 4, 2018, which is hereby incorporated by reference in its entirety.

TECHNICAL FIELD

This application relates to the field of communications technologies, and in particular, to a message playing method and a terminal.

BACKGROUND

With development of terminal technologies, an instant communication application (for example, Messages, WeChat, or QQ) on a mobile phone gradually becomes an indispensable communications tool in a user's life, work, and learning. When a terminal receives a message from the instant communication application, the user needs to manually operate the mobile phone to view and process the message. In some scenarios in which the user is inconvenient to operate the mobile phone, for example, the user is driving a vehicle, the terminal may interact with the user in a voice manner, to determine whether to play the message in the voice manner.

However, in a process in which the terminal interacts with the user in the voice manner, the terminal usually cannot recognize a real intention of the user in the voice, and consequently the terminal cannot perform processing, for example, message playing, according to the user intention. This affects user experience.

SUMMARY

This application provides a message playing method and a terminal, to learn a voice command of a user, so as to recognize an intention of the user and perform a corresponding operation. This helps improve efficiency of interaction between the user and the terminal, and improve user experience.

According to a first aspect, a method provided in one embodiment is applicable to a terminal, and the method includes: receiving, by the terminal, a first message, where the first message is text information; playing, by the terminal, a first voice in response to receiving the first message, where the first voice is used to ask a user whether to play the first message in a voice manner; detecting, by the terminal, a second voice of the user; converting, by the terminal, the second voice into a first text; if the first text does not match a first keyword, continuing, by the terminal, to detect a voice of the user, where the first keyword is a positive keyword; when the terminal detects a third voice of the user, converting, by the terminal, the third voice into a second text; if the second text matches the first keyword, playing, by the terminal, the first message in the voice manner, and recording, by the terminal, a quantity of times of using the first text; and if the quantity of times of using the first text is greater than a first threshold, adding, by the terminal, the first text to the first keyword.

It can be learned that in the technical solution provided in this embodiment, a non-preset reply of a user can be learned, to determine whether the reply is a positive reply, to be specific, whether the user expects to play a message. This increases accuracy of executing a command by the terminal, and a success rate of playing a message in the voice manner by the terminal, so that the terminal is more intelligent, and user experience of using the terminal is improved.

In one implementation, the method further includes: converting, by the terminal, the first message into a fourth voice; and the broadcasting, by the terminal, the first message in the voice manner is specifically: playing, by the terminal, the fourth voice.

In some embodiments, after determining that the second text matches the first keyword, the terminal may convert the text information of the first message into a voice message (namely, the fourth voice), and then play the voice message. In some other embodiments of this application, before determining that the second text matches the first keyword, the terminal may convert the text information of the first message into a voice message (namely, the fourth voice). After determining that the second text matches the first keyword, the terminal may directly play the voice message. This reduces a time period in which the user waits for the terminal to play the first message in the voice manner, and improves user experience. For example, after receiving the first message, or after receiving the first voice of the user, or after converting the third voice of the user into the second text, or after the user matches the second text with the preset first keyword, the terminal may convert the text information of the first message into the fourth voice. A time at which the terminal converts the text information of the first message into the voice message is not limited in this embodiment of this application.

In one implementation, after the adding, by the terminal, the first text to the first keyword, the method further includes: receiving, by the terminal, a second message, where the second message is text information; playing, by the terminal, a fifth voice in response to receiving the second message, where the fifth voice is used to ask the user whether to play the second message in the voice manner; detecting, by the terminal, a sixth voice of the user; converting, by the terminal, the sixth voice into the third text; and if the third text matches an added first keyword, broadcasting, by the terminal, the second message in the voice manner.

It can be learned that after the terminal successfully learns an intention of the user in the first text, when the user uses the voice corresponding to the first text again, the terminal can quickly recognize the intention of the user, and play the second message in the voice manner. This improves efficiency of interaction between the user and the terminal and improves user experience.

In one implementation, before the playing, by the terminal, a first voice, the method further includes: if the terminal determines that the first message belongs to a preset application, and/or a sender of the first message belongs to a preset contact group, and/or the first message includes a second keyword, determining, by the terminal, to play the first voice.

It can be learned that, before playing the message in the voice manner, the terminal may further filter the message. In this way, the user selects, based on a requirement, a specific message to play the message in the voice manner, to prevent excessive messages from playing in the voice manner and disturbing the user. This improves user experience.

In one implementation, before the playing, by the terminal, a first voice, the method further includes: receiving, by the terminal, a third message when receiving the first message; and determining, by the terminal based on a preset priority sequence, that a priority of the first message is higher than a priority of the third message.

It can be learned that when simultaneously receiving a plurality of messages, the terminal may determine a message playing sequence based on a preset priority sequence, to meet diversified requirements of the user and improve user experience.

In one implementation, after the adding, by the terminal, the first text to the first keyword, the method further includes: displaying, by the terminal, prompt information, where the prompt information is used to notify the terminal that the first keyword has been updated.

In one implementation, after the playing, by the terminal, a first voice, the method further includes: if the terminal has not detected the voice of the user within a preset time period, or if the terminal has not detected the voice that is of the user and that matches the first keyword within a preset time period, determining, by the terminal, not to play the first message in the voice manner.

In one implementation, after the playing, by the terminal, a first voice, the method further includes: if the terminal detects, within a preset time period, that a quantity of times of using the voice that is of the user and that does not match the first keyword is greater than a second threshold, determining, by the terminal, not to play the first message in the voice manner.

In one implementation, the first message is a message of an instant communication application.

According to a second aspect, a message playing method provided in an embodiment of this application is applicable to a terminal, and the method includes: receiving, by the terminal, a first message, where the first message is text information; playing, by the terminal, a first voice in response to receiving the first message, where the first voice is used to ask a user whether to play the first message in a voice manner; detecting, by the terminal, a second voice of the user; converting, by the terminal, the second voice into a first text; if the first text does not match a first keyword, continuing, by the terminal, to detect a voice of the user, where the first keyword includes a positive keyword and a negative keyword; when the terminal detects a third voice of the user, converting, by the terminal, the third voice into a second text; and if the second text matches the positive keyword, playing, by the terminal, the first message in the voice manner, and recording, by the terminal, a quantity of times of using the first text; and if the quantity of times of using the first text is greater than a first threshold, adding, by the terminal, the first text to the positive keyword; or if the second text matches the negative keyword, determining, by the terminal, not to play the first message in the voice manner, and recording, by the terminal, a quantity of times of using the first text; and if the quantity of times of using the first text is greater than a first threshold, adding, by the terminal, the first text to the negative keyword.

It can be learned that in the technical solution provided in this embodiment of this application, a non-preset reply of a user can be learned, to determine whether the reply is a positive reply or a negative reply, to be specific, whether the user expects to play a message. This increases accuracy of executing a command by the terminal, and a success rate of playing a message in the voice manner by the terminal, so that the terminal is more intelligent, and user experience of using the terminal is improved.

In one implementation, after the adding, by the terminal, the first text to the positive keyword or the negative keyword, the method further includes: receiving, by the terminal, a second message, where the second message is text information; playing, by the terminal, a fourth voice in response to receiving the second message, where the fourth voice is used to ask the user whether to play the second message in the voice manner; detecting, by the terminal, a fifth voice of the user; converting, by the terminal, the fifth voice into the third text; and if the third text matches an added positive keyword, playing, by the terminal, the second message in the voice manner; or if the third text matches an added negative keyword, determining, by the terminal, not to broadcast the second message in the voice manner.

In one implementation, before the playing, by the terminal, a first voice, the method further includes: if the terminal determines that the first message belongs to a preset application, and/or a sender of the first message belongs to a preset contact group, and/or the first message includes a second keyword, determining, by the terminal, to play the first voice.

In one implementation, before the playing, by the terminal, a first voice, the method further includes: receiving, by the terminal, a third message when receiving the first message; and determining, by the terminal based on a preset priority sequence, that a priority of the first message is higher than a priority of the third message.

In one implementation, after the adding, by the terminal, the first text to the positive keyword or the negative keyword, the method further includes: displaying, by the terminal, prompt information, where the prompt information is used to notify the user that the first keyword has been updated.

In one implementation, after the playing, by the terminal, a first voice, the method further includes: if the terminal has not detected the voice of the user within a preset time period, or if the terminal has not detected the voice that is of the user and that matches the first keyword within a preset time period, determining, by the terminal, not to play the first message in the voice manner.

In one implementation, after the playing, by the terminal, a first voice, the method further includes: if the terminal detects, within a preset time period, that a quantity of times of using the voice that is of the user and that does not match the first keyword is greater than a second threshold, determining, by the terminal, not to play the first message in the voice manner.

In one implementation, the first message is a message of an instant communication application.

According to a third aspect, a terminal is provided. The terminal includes a processor, a memory, and a touchscreen. The memory and the touchscreen are coupled to the processor, the memory is configured to store computer program code, and the computer program code includes a computer instruction. The processor reads the computer instruction in the memory to perform the method in any one of the first aspect and the possible implementations of the first aspect.

According to a fourth aspect, a terminal is provided. The terminal includes a processor, a memory, and a touchscreen. The memory and the touchscreen are coupled to the processor, the memory is configured to store computer program code, and the computer program code includes a computer instruction. The processor reads the computer instruction in the memory to perform the method in any one of the second aspect and the possible implementations of the second aspect.

According to a fifth aspect, a computer storage medium is provided, and includes a computer instruction. When the computer instruction is run on a terminal, the terminal is enabled to perform the method in any one of the first aspect and the possible implementations of the first aspect.

According to a sixth aspect, a computer storage medium is provided, and includes a computer instruction. When the computer instruction is run on a terminal, the terminal is enabled to perform the method in any one of the second aspect and the possible implementations of the second aspect.

According to a seventh aspect, a computer program product is provided. When the computer program product runs on a computer, the computer is enabled to perform the method in any one of the first aspect and the possible implementations of the first aspect.

According to an eighth aspect, a computer program product is provided. When the computer program product runs on a computer, the computer is enabled to perform the method in any one of the second aspect and the possible implementations of the second aspect.

DESCRIPTION OF EMBODIMENTS

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In descriptions of embodiments of this application, unless otherwise stated, "a plurality of" means two or more than two.

For example, a terminal in this application may be a mobile phone, a tablet computer, a personal computer (PC), a personal digital assistant (PDA), a smartwatch, a netbook, a wearable electronic device, an augmented reality (AR) technology device, a virtual reality (VR) device, or the like. A specific form of the terminal is not specially limited in this application.

Figure 1:
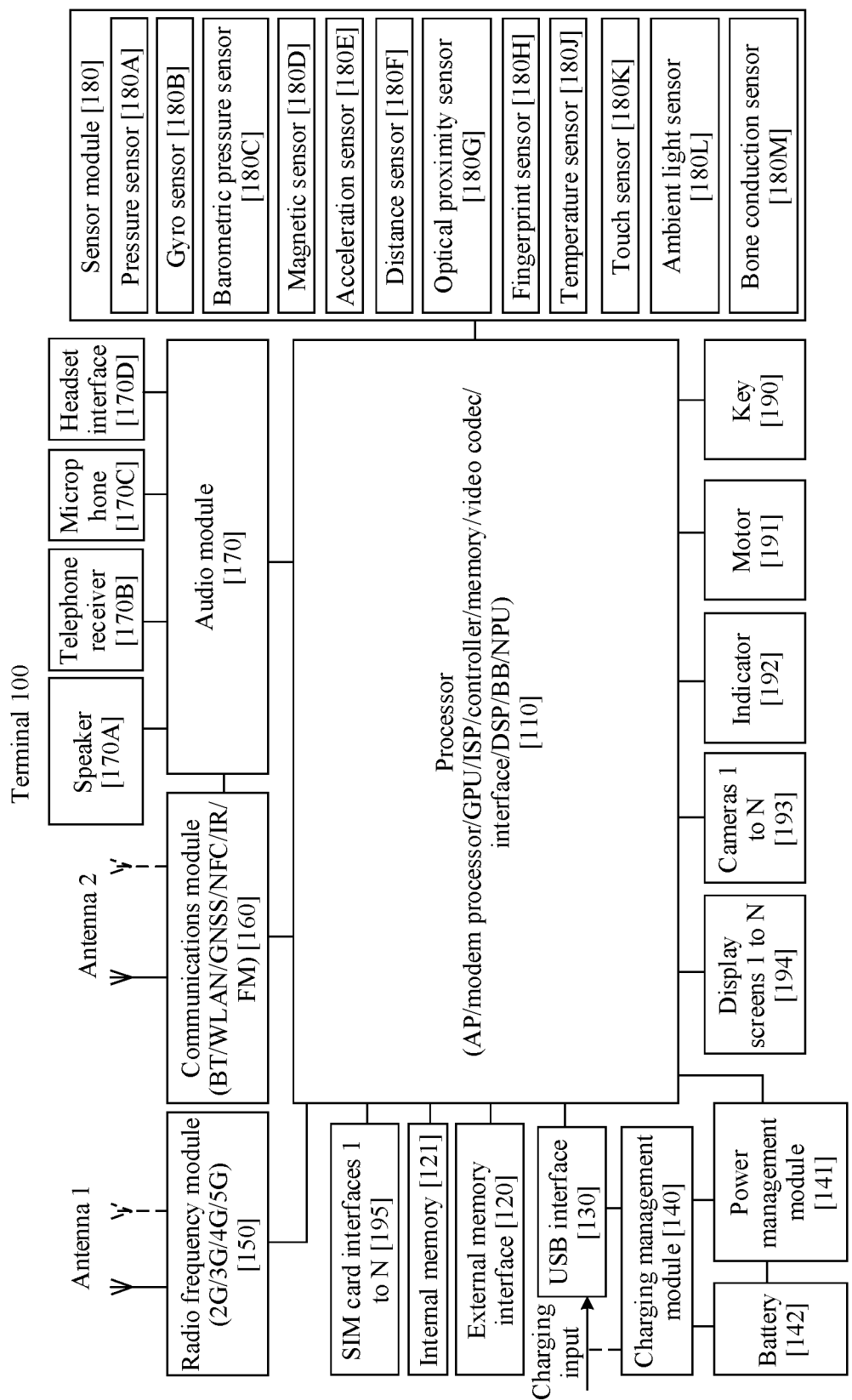
FIG. 1 is a schematic structural diagram 1 of a terminal according to an embodiment of this application.

FIG. 1 is an example of a structural block diagram of a terminal 100 according to an embodiment of the present invention.

The terminal 100 may include a processor 110, an external memory interface 120, an internal memory 121, a USB interface 130, a charging management module 140, a power management module 141, a battery 142, an antenna 1, an antenna 2, a radio frequency module 150, a communications module 160, an audio module 170, a speaker 170A, a telephone receiver 170B, a microphone 170C, a headset interface 170D, a sensor module 180, a key 190, a motor 191, an indicator 192, a camera 193, a display screen 194, a SIM card interface 195, and the like. The sensor module may include a pressure sensor 180A, a gyro sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

A schematic structure in this embodiment of the present invention constitutes no limitation on the terminal 100. The terminal 100 may include more or fewer components than those shown in the figure, or combine some components, or split some components, or have different component arrangements. The components in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural processing unit (NPU). Different processing units may be independent devices, or may be integrated into a same processor.

The controller may be a decision maker that directs each component of the terminal 100 to carry out coordinate work according to an instruction. The controller is a nerve center and a command center of the terminal 100. The controller generates an operation control signal based on an instruction operation code and a time sequence signal, to complete control of instruction fetching and instruction execution.

In some embodiments, the application processor is configured to: obtain a voice of a user, convert the obtained voice of the user into a text, and further match the converted text with a pre-stored keyword and record a quantity of times of using the text, and when the quantity of times of using the text reaches a preset quantity of times, add the text to the corresponding keyword. The application processor may be further configured to: obtain, by using the radio frequency module, the communications module, or the like, a text message sent by another terminal or server to the terminal, and convert the received text message into a voice or the like.

In addition, the memory may be further disposed in the processor 110 to store an instruction and data. In some embodiments, the memory in the processor is a cache. The memory may store an instruction or data that is just used or cyclically used by the processor. If the processor needs to use the instruction or the data again, the processor may directly invoke the instruction or the data from the memory, to avoid repeated access and reduce a waiting time of the processor. Therefore, system efficiency is improved.

In some embodiments, the terminal may store, in the memory in the processor 110, a keyword preset by the user, for example, a keyword of a positive reply and/or a keyword of a negative reply. The terminal may further store, in the memory, recorded content of a voice command, a quantity of times of using the voice command, and the like. In some other embodiments of this application, the terminal may alternatively store data in the internal memory 121 or an external memory. This is not specifically limited in this embodiment of this application.

In some embodiments, the processor 110 may include an interface. The interface may include an integrated circuit (I2C) interface, an inter-integrated circuit sound (I2S) interface, a pulse-code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a bidirectional synchronous serial bus, and includes a serial data line (SDA) and a serial clock line (SCL). In some embodiments, the processor may include a plurality of groups of I2C buses. The processor may be coupled to the touch sensor, a charger, a flash light, the camera, and the like through different I2C bus interfaces. For example, the processor may be coupled to the touch sensor through the I2C interface, so that the processor communicates with the touch sensor through the I2C bus interface, to implement a touch function of the terminal 100.

The I2S interface may be configured for audio communication. In some embodiments, the processor may include a plurality of groups of I2S buses. The processor 110 may be coupled to the audio module through the I2S bus, to implement communication between the processor and the audio module. In some embodiments, the audio module may transfer an audio signal to the communications module through the I2S interface, to implement a function of answering a call by using a Bluetooth headset.

The PCM interface may also be configured for audio communication, and sample, quantize, and code an analog signal. In some embodiments, the audio module may be coupled to the communications module through the PCM bus interface. In some embodiments, the audio module may alternatively transfer an audio signal to the communications module through the PCM interface, to implement the function of answering a call by using the Bluetooth headset. Both the I2S interface and the PCM interface may be configured for audio communication, and sampling rates of the two interfaces are different.

The UART interface is a universal serial data bus, and is configured for asynchronous communication. The bus is a bidirectional communications bus. The bus converts to-be-transmitted data between serial communication and parallel communication. In some embodiments, the UART interface is usually configured to connect the processor to the communications module 160. For example, the processor communicates with a Bluetooth module through the UART interface, to implement a Bluetooth function. In some embodiments, the audio module may transfer an audio signal to the communications module through the UART interface, to implement a function of playing music by using the Bluetooth headset.

In this embodiment, the terminal can implement voice playing of a message through any one or more of the I2S interface, the PCM interface, and the UART interface, transfer a recorded user voice to the processor, and the like.

The MIPI interface may be configured to connect the processor to a peripheral device, for example, the display screen or the camera. The MIPI interface includes a camera serial interface (CSI), a display serial interface (DSI), and the like. In some embodiments, the processor communicates with the camera through the CSI interface, to implement a photographing function of the terminal 100. The processor communicates with the display screen through the DSI interface, to implement a display function of the terminal 100.

In this embodiment of this application, the terminal may display, through the MIPI interface, an interface diagram, for example, a setting interface of the user, mentioned in a process of performing voice playing by the terminal.

The GPIO interface may be configured by using software. The GPIO interface may be configured as a control signal, or may be configured as a data signal. In some embodiments, the GPIO interface may be configured to connect the processor to the camera, the display screen, the communications module, the audio module, a sensor, and the like. The GPIO interface may alternatively be configured as the I2C interface, the I2S interface, the UART interface, the MIPI interface, or the like.

The USB interface 130 may be a mini USB interface, a micro USB interface, a USB Type C interface, or the like. The USB interface may be configured to connect to the charger to charge the terminal 100, or may be configured to transmit data between the terminal 100 and a peripheral device. The USB interface may alternatively be connected to a headset, to play audio by using the headset. The USB interface may alternatively be connected to another electronic device, for example, an AR device.

An interface connection relationship between the modules shown in this embodiment of the present invention is merely an example for description, and does not constitute a limitation on the structure of the terminal 100. The terminal 100 may use different interface connection manners or a combination of a plurality of interface connection manners in this embodiment of the present invention.

The charging management module 140 is configured to receive charging input from the charger. The charger may be a wireless charger or a wired charger. The power management module 141 is connected to the battery 142, the charging management module 140, and the processor 110. The power management module receives input of the battery and/or the charging management module, and supplies power to the processor, the internal memory, the external memory, the display screen, the camera, the communications module, and the like. A wireless communication function of the terminal 100 may be implemented by using the antenna 1, the antenna 2, the radio frequency module 150, the communications module 160, the modem processor, the baseband processor, and the like.

The antenna 1 and the antenna 2 are configured to transmit and receive an electromagnetic wave signal. Each antenna in the terminal 100 may be configured to cover one or more communication frequency bands. The radio frequency module 150 may provide a communications processor module that is applied to the terminal 100 and that includes a wireless communication solution, for example, 2G/3G/4G/5G. The radio frequency module 150 may include at least one filter, a switch, a power amplifier, a low noise amplifier (LNA), and the like. The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and is then transferred to the application processor. The application processor outputs a sound signal by using an audio device (not limited to the speaker, the telephone receiver, or the like), or displays an image or a video by using the display screen. The communications module 160 may provide a communications processor module of wireless communication solutions, including a wireless local area network (WLAN), Bluetooth (BT), a global navigation satellite system (GNSS), frequency modulation (FM), a near field communication (NFC) technology, an infrared (IR) technology, and the like that are applied to the terminal 100. The communications module 160 may be one or more devices integrating at least one communications processor module. The communications module receives an electromagnetic wave by using the antenna 2, performs frequency modulation and filtering processing on an electromagnetic wave signal, and sends a processed signal to the processor. The communications module 160 may alternatively receive a to-be-sent signal from the processor, perform frequency modulation and amplification on the signal, and convert the signal into an electromagnetic wave for radiation by using the antenna 2.

In some embodiments of this application, the voice of the user may be recorded by using the microphone in the Bluetooth headset (or a Bluetooth sound box, or the like), and the recorded voice is transferred to the processor 110 by using a Bluetooth communications processor module and the audio module 170. After the processor 110 converts the received text message into a voice, the terminal may further play the voice by using the Bluetooth headset (or the Bluetooth sound box, or the like) through the audio module 170 and the Bluetooth communication processor module.

In some embodiments, the antenna 1 of the terminal 100 is coupled to the radio frequency module, and the antenna 2 is coupled to the communications module. In this way, the terminal 100 may communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), the BT, the GNSS, the WLAN, the NFC, the FM, the IR technology, and/or the like. The GNSS may include a global positioning system (GPS), the global navigation satellite system (GLONASS), a Beidou navigation satellite system (BDS), a quasi-zenith satellite system (QZSS), and/or a satellite-based augmentation system (SBAS).

In this embodiment of this application, the terminal may receive, by using the antenna 1 and the radio frequency module, a message sent by another terminal, for example, a Messages message. The terminal may alternatively receive, by using the antenna 2 and the communications module, a message sent by another terminal, for example, a WeChat message or a QQ message. The message is not specifically limited in this embodiment of this application.

The terminal 100 implements the display function by using the GPU, the display screen 194, the application processor, and the like. The GPU is a microprocessor for image processing, and is connected to the display screen and the application processor. The GPU is configured to perform mathematical and geometric calculation, and is configured to render an image. The processor 110 may include one or more GPUs that execute a program instruction to generate or change display information.

The display screen 194 is configured to display an image, a video, and the like. The display screen includes a display panel. The display panel may use an LCD (liquid crystal display, liquid crystal display screen), an OLED (organic light-emitting diode, organic light-emitting diode), an active-matrix organic light-emitting diode or an active-matrix organic light-emitting diode (AMOLED), a flexible light-emitting diode (FLED), a miniled, a microLed, a micro-oLed, a quantum dot light-emitting diode (QLED), or the like. In some embodiments, the terminal 100 may include one display or N display screens, where N is a positive integer greater than 1.

The mobile terminal 100 can implement the photographing function by using the ISP, the camera 193, the video codec, the GPU, the display screen, the application processor, and the like.

The external memory interface 120 may be connected to an external storage card, for example, a micro SD card, to extend a storage capability of the terminal 100. The external storage card communicates with the processor through the external memory interface, to implement a data storage function. For example, a file, for example, music or a video, is stored into the external storage card.

The internal memory 121 may be configured to store computer-executable program code, and the executable program code includes an instruction. The processor 110 runs the instruction stored in the internal memory 121, to implement various function applications and data processing of the terminal 100. The memory 121 may include a program storage area and a data storage area. The program storage area may store an operating system, an application program required by at least one function (for example, a sound playing function or an image playing function), and the like. The data storage area may store data (for example, audio data or a phone book) created during use of the terminal 100, and the like. In addition, the memory 121 may include a high-speed random access memory, and may further include a nonvolatile memory, for example, at least one magnetic disk storage device, a flash storage device, another volatile solid-state storage device, a universal flash storage (universal flash storage, UFS), or the like.

The terminal 100 can implement an audio function by using the audio module 170, the speaker 170A, the telephone receiver 170B, the microphone 170C, the headset interface 170D, the application processor, and the like, for example, music playing or recording.

The audio module 170 is configured to convert digital audio information into an analog audio signal for output, or is configured to convert analog audio input into a digital audio signal. The audio module may be further configured to encode and decode an audio signal. In some embodiments, the audio module may be disposed in the processor 110, or some functional modules in the audio module are disposed in the processor 110.

The speaker 170A, also referred to as a "loudspeaker", is configured to convert an audio electrical signal into a sound signal. The terminal 100 may play music by using the speaker, or receive a hands-free call.

The telephone receiver 170B, also referred to as an "earpiece", is configured to convert an audio electrical signal into a sound signal. When a call is answered or voice information is received by using the terminal 100, the telephone receiver may be put close to a human ear to receive a voice.

The microphone 170C, also referred to as a "mic" or a "sound conducting device", is configured to convert a sound signal into an electrical signal. When making a call or sending voice information, a user may make a sound by moving a mouth of the user near the microphone to input a sound signal to the microphone. At least one microphone may be disposed in the terminal 100. In some embodiments, two microphones may be disposed in the terminal 100, to collect a sound signal and further implement a noise reduction function. In some embodiments, three, four, or more microphones may alternatively be disposed in the terminal 100, to collect a sound signal, reduce noise, and further recognize a sound source, implement a directional recording function, and the like.

The headset interface 170D is connected to a wired headset. The headset interface may be a USB interface, or may be a 3.5 mm open mobile terminal platform (OMTP) standard interface or a cellular telecommunications industry association of the USA (CTIA) standard interface.

In some embodiments, the terminal may record the voice of the user by using the microphone 170C, and transfer the recorded voice to the processor 110 by using the audio module 170. After the processor 110 converts the received text message into a voice, the terminal may further play the voice by using the speaker through the audio module 170. In some other embodiments of this application, the terminal may record the voice of the user by using a microphone in the wired headset, and transfer the recorded voice to the processor 110 by using the headset interface 170D and the audio module 170. After the processor 110 converts the received text message into a voice, the terminal may further play the voice by using the wired headset through the audio module 170 and the headset interface 170D.

The touch sensor 180K is also referred to as a "touch panel", may be set on the display screen, and is configured to detect a touch operation performed on or near the touch sensor 180K. The touch sensor 180K may transfer the detected touch operation to the application processor, to determine a touch event type, and provide corresponding visual output by using the display screen.

The key 190 includes a power key, a volume key, and the like. The key may be a mechanical key, or may be a touch key. The terminal 100 receives key input, and generates key signal input related to a user setting and function control of the terminal 100.

The motor 191 may generate a vibration prompt. The motor may be used for an incoming call vibration prompt, or may be used for a touch vibration feedback. For example, touch operations performed on different applications (for example, a photographing application and an audio playing application) may correspond to different vibration feedback effects. Different touch operations performed in different areas of the display screen may also correspond to different vibration feedback effects. Different application scenarios (for example, a time reminder, information receiving, an alarm clock, a game, and the like) may also correspond to different vibration feedback effects. Customization of a touch vibration feedback effect may further be supported.

The indicator 192 may be an indicator light that may be configured to indicate a charging status and a battery power change, or may be configured to indicate a message, a missed call, a notification, and the like.

The SIM card interface 195 is connected to a subscriber identity module (SIM). A SIM card may be inserted into the SIM card interface or removed from the SIM card interface, to implement contact with or separation from the terminal 100. The terminal 100 may support one SIM card interface or N SIM card interfaces, where N is a positive integer greater than 1. The SIM card interface may support a nano SIM card, a micro SIM card, a SIM card, and the like. A plurality of cards may be inserted into a same SIM card interface simultaneously. The plurality of cards may be of a same type or different types. The SIM card interface may also be compatible with different types of SIM cards, and the SIM card interface may alternatively be compatible with the external storage card. The terminal 100 interacts with a network by using the SIM card, to implement functions such as calling and data communication. In some embodiments, the terminal 100 uses an eSIM, namely, an embedded SIM card. The eSIM card may be embedded in the terminal 100, and cannot be separated from the terminal 100.

A software system of the terminal 100 may use a layered architecture, an event-driven architecture, a microkernel architecture, a microservice architecture, or a cloud architecture. In this embodiment of the present invention, an Android system with the layered architecture is used as an example to describe a software structure of the terminal 100.

In the layered architecture, software is divided into several layers, and each layer has a clear role and task. The layers communicate with each other through an interface. In some embodiments, the Android system is divided into four layers, namely, an application program layer, an application program framework layer, Android runtime (Android runtime) and a system library, and a kernel layer from top to bottom.

The application program layer may include a series of application program packages.

Figure 2:
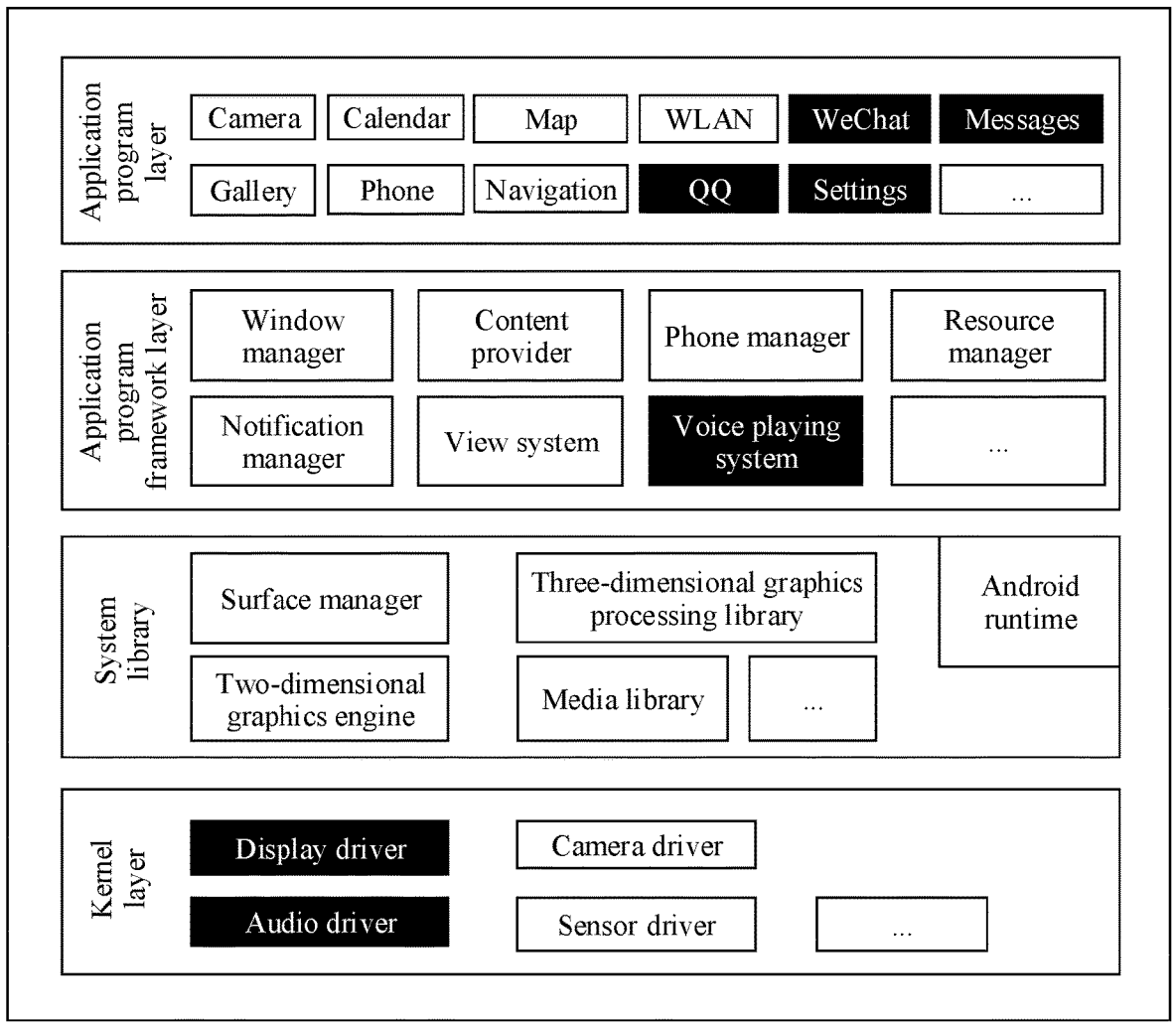
FIG. 2 is a schematic structural diagram 2 of a terminal according to an embodiment of this application.

As shown in FIG. 2, an application program package may include application programs such as camera, gallery, calendar, phone, map, navigation, WLAN, Bluetooth, music, video, Messages, WeChat, QQ, and setting.

In some embodiments, the application program package mainly includes instant communication applications, including but not limited to the application programs such as Messages, WeChat, and QQ. In some other embodiments of this application, a setting application is further involved, to provide an interface for setting a message played in a voice manner for a user. Content of setting includes but is not limited to a preset application, a preset contact, a preset contact group, a preset second keyword, a playing priority, and the like.

The application program framework layer provides an application programming interface (API) and a programming framework for an application program at the application program layer. The application program framework layer includes some predefined functions.

As shown in FIG. 2, the application program framework layer may include a window manager, a content provider, a view system, a phone manager, a resource manager, a notification manager, and the like.

The window manager is configured to manage a window program. The window manager may obtain a size of a display screen, determine whether there is a status bar, lock a screen, take a screenshot, and the like.

The content provider is configured to: store and obtain data, and make the data accessible to an application program. The data may include a video, an image, audio, calls that are made and answered, a browsing history and a bookmark, a phone book, and the like.

The view system includes visual controls such as a control for displaying a character and a control for display a picture, and the view system may be configured to construct an application program. A display interface may include one or more views. For example, a display interface including a Messages notification icon may include a view for displaying a character and a view for displaying a picture.

The phone manager is configured to provide a communication function of the terminal 100, for example, management of call statuses (including a connected state, a disconnected state, and the like).

The resource manager provides various resources such as a localized character string, an icon, a picture, a layout file, and a video file for an application program.

The notification manager enables an application program to display notification information in a status bar, and may be configured to convey a notification-type message. The notification-type message may automatically disappear after the message is displayed for a short period of time without user interaction. For example, the notification manager is configured to provide a notification of download completion, a message reminder, and the like. The notification manager may alternatively be a notification that appears on the top of a status bar of a system in a text form of a graph or a scroll bar, for example, a notification of an application program running in the background or a notification that appears on a screen in a form of a dialog window. For example, text information is prompted in the status bar, a prompt tone is produced, the terminal vibrates, or the indicator light blinks.

In some embodiments, the application program framework layer may further include a voice playing system, and the voice playing system provides a voice playing service for an instant message. It should be noted that the voice playing system may be an independent module at the application framework layer, or the voice playing system may invoke another module at the application program framework layer to jointly complete a voice playing function of the instant message. This is not specifically limited in this embodiment of this application.

The Android runtime includes a kernel library and a virtual machine, and the Android runtime is responsible for scheduling and management of the Android system.

The kernel library includes two parts: a function that needs to be invoked by a Java language and a kernel library of Android.

The application program layer and the application program framework layer run on the virtual machine. The virtual machine executes a Java file at the application program layer and the application program framework layer as a binary file. The virtual machine is configured to perform functions such as object lifecycle management, stack management, thread management, security and exception management, and garbage collection.

The system library may include a plurality of functional modules, for example, a surface manager, a media library, a three-dimensional graphics processing library (OpenGL ES), and a 2D graphics engine (SGL).

The surface manager is configured to: manage a display subsystem, and provide fusion of 2D and 3D layers for a plurality of application programs.

The media library supports playback and recording of a plurality of commonly used audio and video formats, static image files, and the like. The media library may support a plurality of audio and video coding formats, for example, MPEG4, H.264, MP3, AAC, AMR, JPG, and PNG.

OpenGL ES is configured to implement three-dimensional graphics drawing, image rendering, composition, layer processing, and the like.

SGL is a 2D drawing engine.

The kernel layer is a layer between hardware and software. The kernel layer includes at least a display driver, a camera driver, an audio driver, and a sensor driver.

The following uses an example in which a message of a Messages application is processed to describe a working process of software and hardware of the terminal 100.

When receiving one message, the Messages application at the application program layer may invoke the display driver at the kernel layer, to display prompt information of the message on a touchscreen at a hardware layer, so as to prompt a user to view the message. In this case, after the user taps, by using the touchscreen at the hardware layer, a control corresponding to the prompt information of the message, the touchscreen may be triggered to report, to the kernel layer by using a corresponding driver, a touch event (for example, a parameter including a touch point location, a time, or the like) generated by a touch action of the user. After encapsulating the touch event, the kernel layer invokes a corresponding API to distribute the touch event to the Messages application. Then, the terminal starts the Messages application, and displays an interface for viewing the message. In this way, the user can view content of the message.

Considering that the user is inconvenient to manually operate the terminal, when receiving the one message, the Messages application at the application program layer may invoke the voice playing system at the framework layer. The voice playing system may play, by invoking the audio driver at the kernel layer and by using an audio output device (for example, a Bluetooth headset or a speaker), a voice for asking the user whether to play the message. Then, an audio input device (for example, a Bluetooth headset or a microphone) records the voice of the user, and then reports the recorded voice of the user to the kernel layer by using a corresponding driver. After encapsulating the event, the kernel layer invokes a corresponding API to distribute the event to the voice playing system of the framework layer. Then, the voice playing system determines, based on the event, whether to play the message in a voice manner. Specifically, the voice playing system may convert the reported voice of the user into a text, and match the converted text with a pre-stored keyword (a keyword of a positive reply and/or a keyword of a negative reply). If the converted text matches the keyword of the positive reply, it is determined that the message is played in the voice manner. In this case, the voice playing system converts the message into a voice message, invokes the audio driver at the kernel layer, and plays the voice message by using the audio output device. If the converted text matches the keyword of the negative reply, it is determined that the message is not played in the voice manner. In this way, when the user is inconvenient to manually operate the terminal, the user can also process the message.

In addition, in the embodiments, the voice playing system may further record a quantity of times of using the converted text. When the quantity of times of using the converted text reaches a predetermined quantity of times, the text may be further added to the keyword, to learn the voice of the user. In addition, the voice playing system may further invoke the display driver at the kernel layer, to display, by using the touchscreen, an interface in embodiments of this application, for example, interface diagrams shown in FIG. 7(1) to FIG. 7(4) and FIG. 8(1) to FIG. 8(6).

All methods in the following embodiments may be implemented in the terminal 100 having the hardware structure and the software structure.

To enable the user to process some important and urgent instant messages in a timely manner when the user uses the terminal and the user is inconvenient to manually operate the terminal, an embodiment of this application provides a method for playing an instant message in a voice manner. Further, in consideration of factors such as a factor that the user may forget a preset voice command or a language habit of the user, the voice command of the user is not a voice command preset by the terminal. Therefore, the terminal cannot recognize an intention of the user, and cannot perform an operation expected by the user. Therefore, in the technical solutions provided in the embodiments of this application, the voice command of the user can be learned, to automatically recognize a real meaning of the voice command of the user. This improves use efficiency of the terminal and improves user experience.

The following describes technical solutions provided in the embodiments of this application with reference to accompanying drawings and specific application scenarios.

In a first application scenario, a terminal asks a user whether to play a newly received message in a voice manner.

Figure 3A:
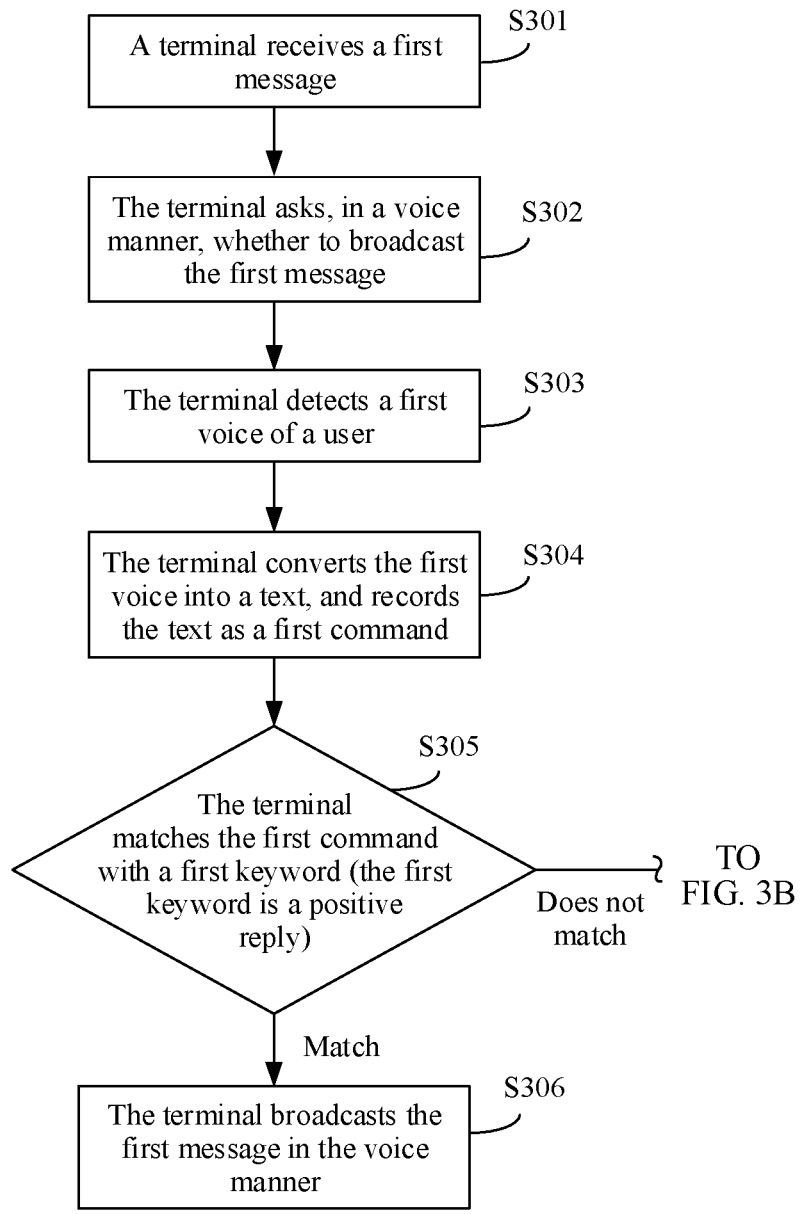
FIG. 3A and FIG. 3B are a schematic flowchart 1 of a message playing method according to an embodiment of this application.
Figure 3B:
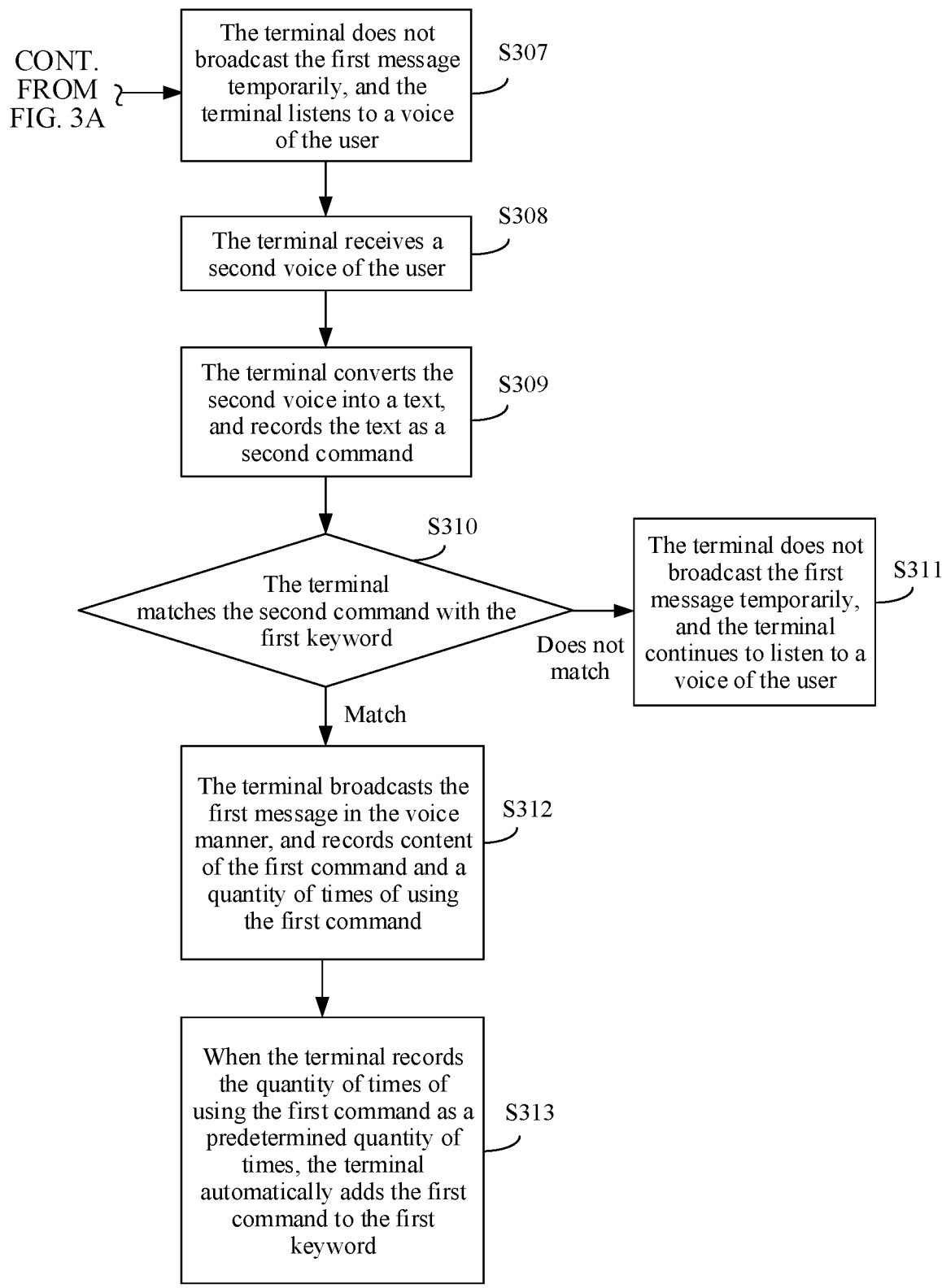

FIG. 3A and FIG. 3B are a schematic flowchart of a method for playing a message in a voice manner according to an embodiment of this application. The method specifically includes the following steps.

S301: A terminal receives a first message.

In some embodiments, the terminal receives the first message sent by another terminal or a server. The first message may be a message of an instant communication application, for example, a message of a Messages application, a message of a WeChat application, or a message of a QQ application.

S302: The terminal asks, in a voice manner, whether to play the first message.

After newly receiving the first message, the terminal displays prompt information of the first message in a terminal interface. The terminal may ask, in the voice manner, the user whether to play the first message before, when, or after displaying the prompt information of the first message.

In this embodiment, the terminal may perform voice playing by using an audio device, for example, a speaker, a wired headset, a wireless headset, a Bluetooth sound box, or a Bluetooth vehicle-mounted device. This is not specifically limited in this embodiment of this application.

Figure 8:
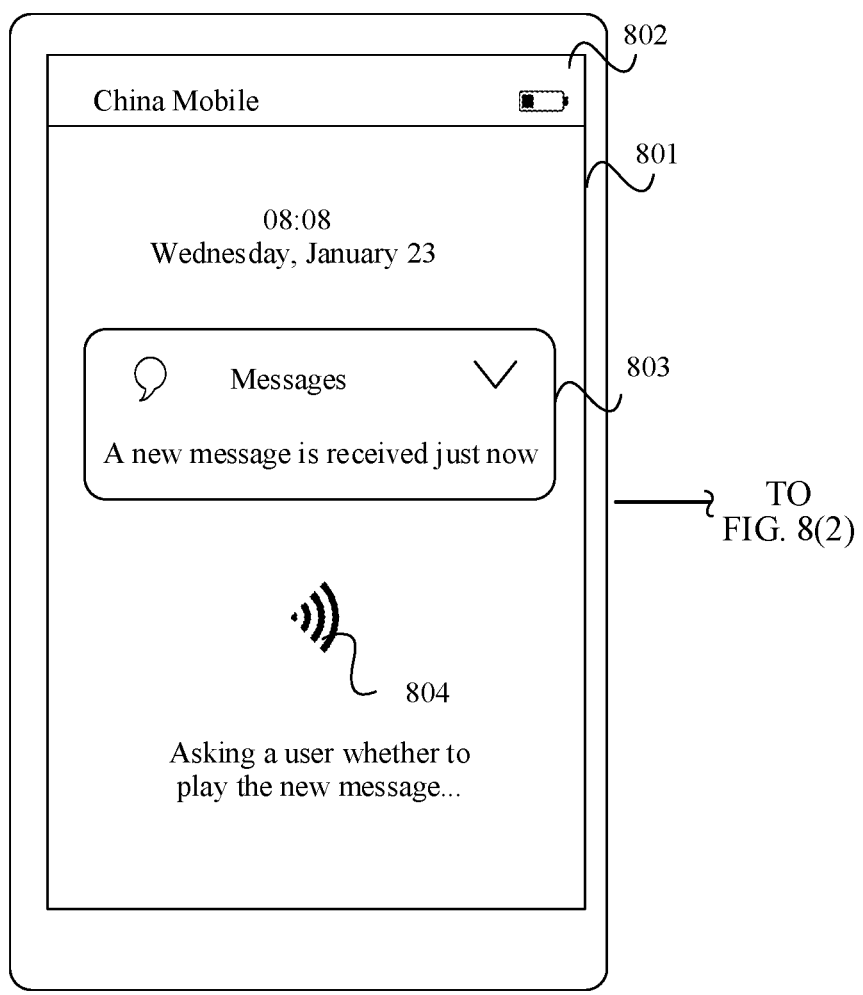
FIG. 8(1) to FIG. 8(6) are a schematic diagram of other terminal interfaces according to an embodiment of this application.
Figure 8:
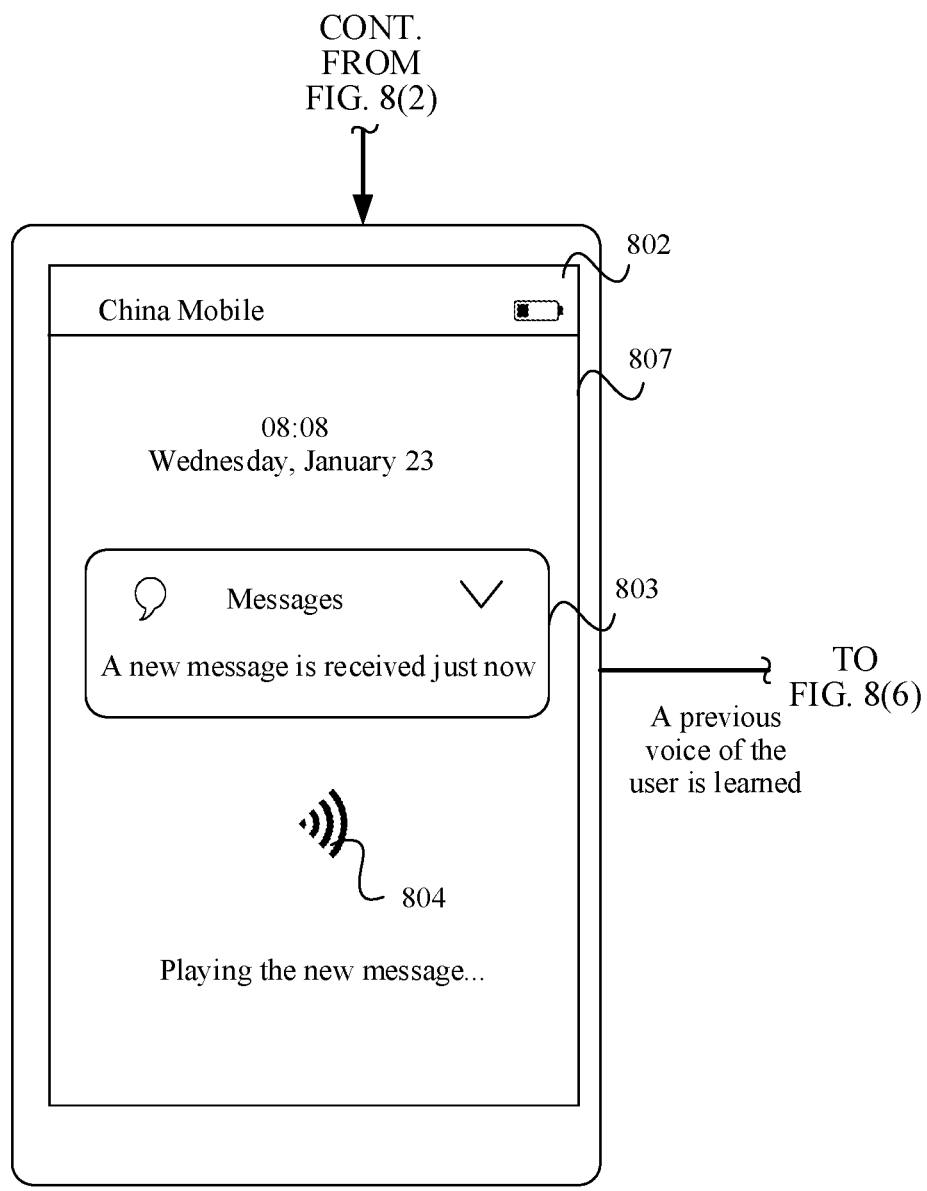
Figure 8:
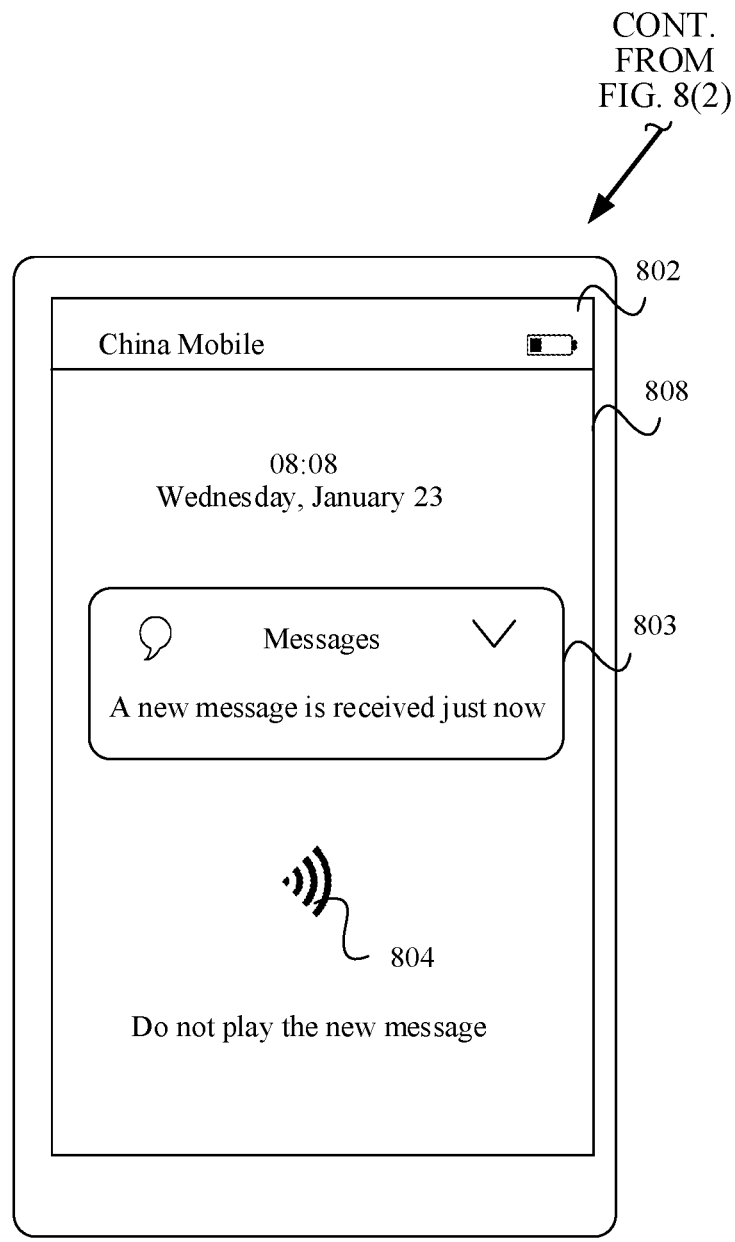
Figure 8:
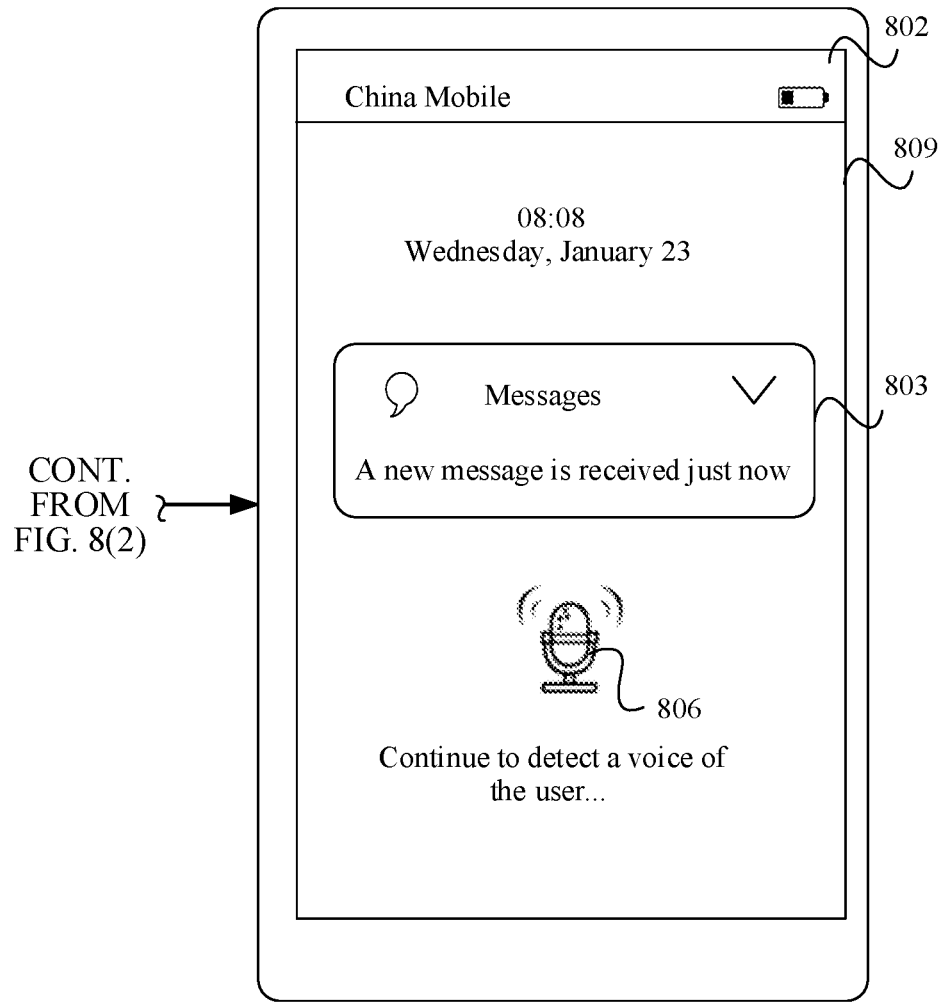
Figure 8:
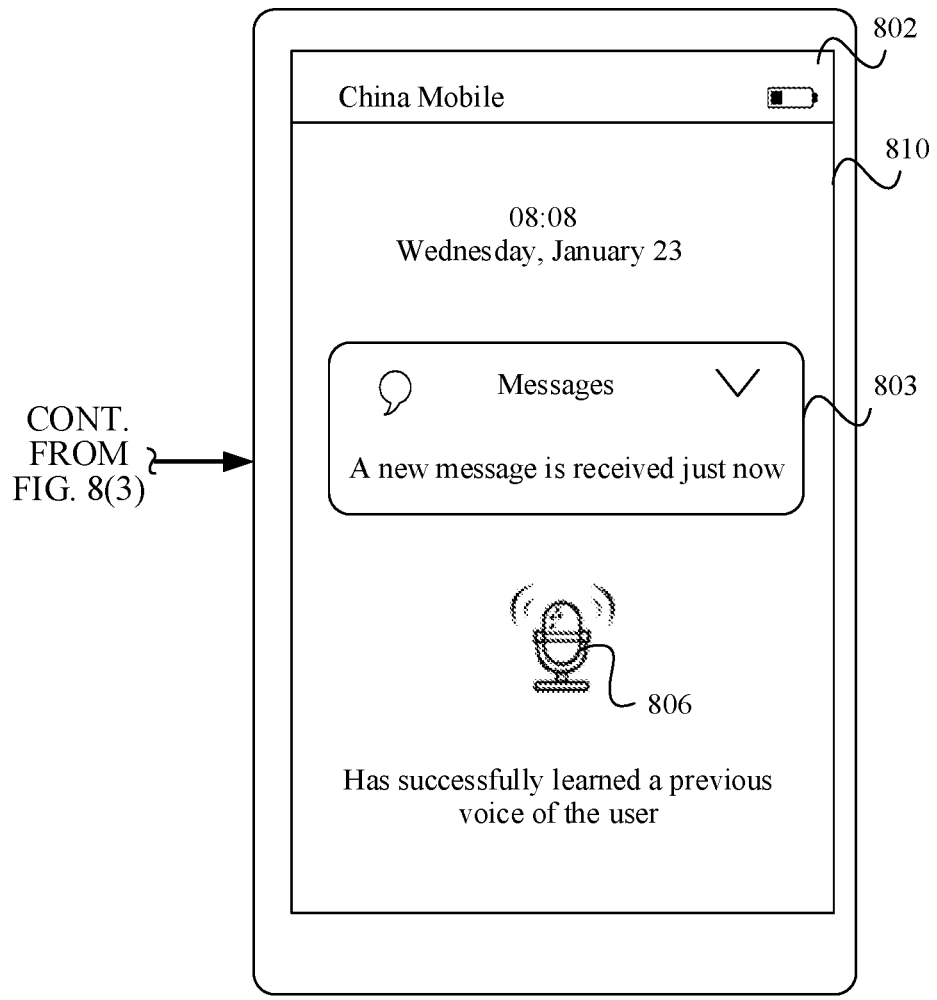

For example, FIG. 8(1) shows an interface 801 displayed by the terminal. The interface 801 may display a status bar 802, a message prompt box 803, a pattern 804, a time widget, and the like. The status bar 802 may include a name of an operator (for example, China Mobile), a time, a WiFi icon, signal strength, current remaining power, and the like. The interface 801 is an interface diagram in which the terminal asks, in the voice manner, the user whether to play the first message. The terminal may dynamically display the pattern 804, or change a color, a gray scale, or the like of the pattern 804, to notify the user that the terminal is playing a voice. Alternatively, the terminal may display text information, to notify that the terminal is asking the user whether to play the first message. It should be noted that a prompt manner of the terminal is not limited in this embodiment of this application.

S303: The terminal detects a first voice of the user.

For example, the terminal records the first voice of the user by using an audio input device, and sends the recorded first voice of the user to an application processor of the terminal for processing.

For example, FIG. 8(2) shows an interface 805 displayed by the terminal. The interface 805 may display a status bar 802, a message prompt box 803, a pattern 806, a time widget, and the like. The interface 805 is an interface in which the terminal detects a voice of the user. The terminal may dynamically display the pattern 806, or change a color, a gray scale, or the like of the pattern 806, to notify the user that the terminal detects the voice of the user or that the terminal is processing the detected voice of the user. Alternatively, the terminal may display text information, to notify that the terminal detects the voice of the user and is processing the detected voice of the user. It should be noted that a prompt manner in which the terminal detects the voice of the user (or is processing the voice of the user) is not limited in this embodiment of this application.

S304: The terminal converts the first voice into text information, and records the text information as a first command.

S305: The terminal matches the first command with a first keyword pre-stored in the terminal.

The first keyword may include a command preset by the terminal, for example, a command of a positive reply or a command of a negative reply. The first keyword may be a default keyword of the terminal, or may be set by the user. Alternatively, the first keyword may be learned by the terminal. For a specific learning method, refer to the following description.

For example, in some embodiments of this application, the preset first keyword may be a keyword of a positive reply. To be specific, if the first command matches the first keyword, it can be determined that the first command is a command that the user expects to play the first message in the voice manner. If the first command does not match the first keyword, the first command needs to be learned by using the method (as shown in FIG. 3A and FIG. 3B) in this embodiment of this application, to determine whether the first command is a positive reply.

In some other embodiments, the preset first keyword may alternatively be a keyword of a negative reply. To be specific, if the first command matches the first keyword, it can be determined that the first command is a command that the user does not expect to play the first message in the voice manner. In this case, the terminal learns the first command, to determine that the first command is a negative reply. In some still other embodiments of this application, the preset first keyword may alternatively include both a keyword of a positive reply and a keyword of a negative reply. In this case, the terminal needs to separately perform processing based on a type of first keyword that matches the first command. This case is explained below. This is not limited in this embodiment of this application.

In the following steps S306 to S313, an example in which the first keyword is the positive reply is used to describe a process in which the terminal learns the first command. If the first command matches the first keyword, it is determined that the first command is a positive reply, and the user expects to play the first message in the voice manner. Therefore, the terminal plays the first message in the voice manner, that is, performs step S306. If the first command does not match the first keyword, step S307 is performed.

S306: The terminal plays the first message in the voice manner.

The step of playing the first message in the voice manner specifically includes: playing content of the first message in the voice manner, or playing a name of an application to which the first message belongs, a name of a sender of the first message, or the like.

In some embodiments, after determining that the first command is the positive reply, the terminal may convert the text information of the first message into a voice message, and then play the voice message.

In some other embodiments, before determining that the first command is the positive reply, the terminal may convert the text information of the first message into a voice message. After determining that the first command is the positive reply, the terminal may directly play the voice message. This reduces a time period in which the user waits for the terminal to play the first message in the voice manner, and improves user experience. For example, after receiving the first message, or after receiving the first voice of the user, or after converting the first voice of the user into the first command, or after the user matches the first command with the preset first keyword, the terminal may convert the text information of the first message into a voice message. A time at which the terminal converts the text information of the first message into the voice message is not limited in this embodiment of this application.

For example, FIG. 8(3) shows an interface 807 displayed by the terminal. The interface 807 may display a status bar 802, a message prompt box 803, a pattern 804, a time widget, and the like. The interface 807 is an interface in which the terminal is playing the first message. The terminal may dynamically display the pattern 804, or change a color, a gray scale, or the like of the pattern 804, to notify the user that the terminal is playing the first message. Alternatively, the terminal may display prompt information, to notify the user that the terminal is playing the first message. It should be noted that a prompt manner in which the terminal is playing the first message is not limited in this embodiment of this application.

S307: The terminal does not play the first message temporarily, and continues to listen to a voice of the user.

For example, FIG. 8(5) shows an interface 809 displayed by the terminal. The interface 809 may display a status bar 802, a message prompt box 803, a pattern 806, a time widget, and the like. The interface 809 is an interface in which the terminal continues to listen to a voice of the user because the terminal fails to recognize the voice command of the user. The terminal may dynamically display the pattern 806, or change a color, a gray scale, or the like of the pattern 806, to notify the user that the terminal fails to recognize the voice command of the user. Alternatively, the terminal may display text information, to notify the user that the terminal continues to listen to the voice of the user because the terminal fails to recognize the voice command of the user. Alternatively, the terminal may notify, in the voice manner, the user that the terminal fails to recognize an indication of the user, and then continues to listen to the voice of the user. It should be noted that a specific prompt form of the terminal is not limited in this embodiment of this application.

S308: The terminal detects a second voice of the user.

S309: The terminal converts the detected second voice into text information, and records the text information as a second command.

S310: The terminal matches the second command with the first keyword preset by the terminal. If the second command does not match the preset first keyword, step S311 is performed. If the second command matches the preset first keyword, step S312 is performed.

S311: The terminal does not play the first message temporarily, and continues to listen to a voice of the user.

In some other embodiments, if the terminal has not received the voice of the user within a preset time period (for example, 30 seconds, where the preset time period may be a default time period of the terminal, or may be set by the user), or when the terminal has not received, within a preset time period, the voice of the user that matches the set first keyword, the terminal may end this procedure. In other words, the terminal considers by default that the user does not expect to play the first message in the voice manner.

In some still other embodiments, if the terminal detects that a quantity of times of using the voice that is of the user and that does not match the set first keyword reaches the preset quantity of times, the terminal may end this procedure. In other words, the terminal considers by default that the user does not expect to play the first message in the voice manner.

For example, FIG. 8(4) shows an interface 808 displayed by the terminal. The interface 808 may display a status bar 802, a message prompt box 803, a pattern 804, a time widget, and the like. The interface 808 is an interface in which the terminal determines not to play the first message. The terminal may change a color, a gray scale, or the like of the pattern 804, to notify the user that the terminal does not play the first message. Alternatively, the terminal may display text information, to notify the user that the terminal does not play the first message. It should be noted that a manner in which the terminal notifies the user that the terminal does not play the first message is not limited in this embodiment of this application.

S312: The terminal plays the first message in the voice manner. In addition, the terminal records content of the first command and a quantity of times of using the first command.

It should be noted that when the first command does not match the preset first keyword, there are two possible cases. In one possible case, the user expects to play the first message, but may forget preset content of the positive reply. Therefore, the first command converted from the first voice is different from the preset positive reply. In the other possible case, the first voice of the user is not a reply made for inquiry of the terminal. For example, the first voice may be a dialogue between the user and another person. After receiving the first voice, the terminal mistakenly considers that the first voice is the first command of the user.

In this case, the terminal needs to record the content of the first command and the quantity of times that the user uses the first command.

S313: When the terminal records the quantity of times of using the first command as the predetermined quantity of times (or the quantity of times of using the first command is greater than the predetermined quantity of times), the terminal automatically adds the first command to the first keyword.

In a scenario of the predetermined quantity of times (for example, M times, where M is a natural number greater than 2), if the user first answers, by using the first command, to the terminal asking whether to play the message, and then makes a reply by using the positive reply set by the terminal, the terminal may consider that the first command of the user is the positive reply and that the user expects the terminal to play the message in the voice manner. Therefore, the terminal learns that the first command of the user is the positive reply.

For example, FIG. 8(6) shows an interface 810 displayed by the terminal. The interface 810 may display a status bar 802, a message prompt box 803, a pattern 806, a time widget, and the like. The interface 810 is an interface in which the terminal has successfully learned the first command. The terminal may change a color, a gray scale, or the like of the pattern 806, to notify the user that the terminal has learned the first command. Alternatively, the terminal may display text information, to notify the user that the terminal has successfully learned the first command, or to add the first command to the keyword of the positive reply. It should be noted that a prompt manner of the terminal is not limited in this embodiment of this application.

It should be noted that the terminal may display prompt information indicating that the first command has successfully learned after playing the message, or may display prompt information indicating that the first command has successfully learned before playing the message, or may not display prompt information indicating that the first command has successfully learned. This is not limited in this embodiment of this application.

Then, when the terminal receives a message (for example, a third message) again, the terminal asks, in the voice manner, whether to play the message. When the terminal detects a voice of the user, and the voice of the user is converted into the first command (to be specific, in this case, content of the voice of the user is the same as content of the first voice), the terminal matches the first command with the set first keyword. In this case, because the first keyword set by the terminal includes the first command (a learning result), matching succeeds. The terminal determines that the user expects to play the message in the voice manner, and therefore the terminal plays the third message in the voice manner.

For example, the user sets the positive reply to "yes" and "play". When the user replies "please say" for the first time, the terminal matches "please say" with the set positive reply. If it is determined that "please say" is not the set positive reply, the terminal does not play the message in the voice manner temporarily, and continues to listen to a reply of the user. If the user replies "play" for the second time, the terminal matches "play" with the preset positive reply. If it is determined that "play" is the set positive reply, the terminal plays the message in the voice manner. In addition, the terminal records "please say" once. Then, after the terminal asks the user whether the message needs to be played in the voice manner, if the user still replies "please say", and then replies the positive reply set by the terminal. The terminal records "please say" twice. After a quantity of times of answering "please say" recorded by the terminal reaches a preset quantity of times, the terminal learns that "please say" is the positive reply. Then, the terminal may set "please say" to the positive reply. Afterwards, when the terminal receives "please say" again used by the user, and the terminal matches "please say" with the set positive reply, it can be determined that "please say" is the positive reply, and the terminal plays the message in the voice manner.

It can be learned that in the technical solution provided in this embodiment of this application, a non-preset reply of a user can be learned, to determine a real intention of the user and whether the user expects to play a message. This increases accuracy of executing a command by the terminal, and a success rate of playing a message in the voice manner by the terminal, so that the terminal is more intelligent, and user experience of using the terminal is improved.

Figure 4A:
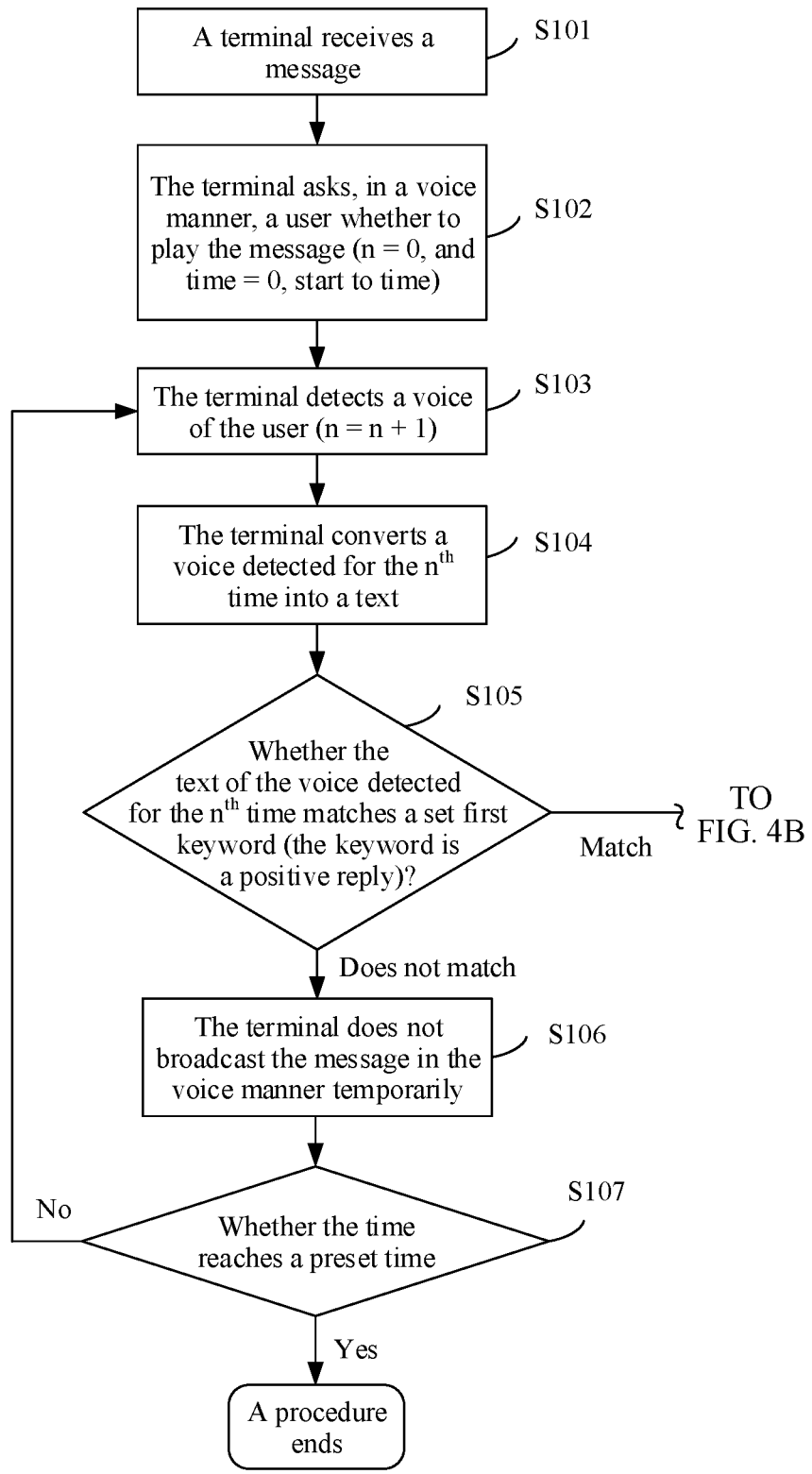
FIG. 4A and FIG. 4B are a schematic flowchart 2 of a message playing method according to an embodiment of this application.
Figure 4B:
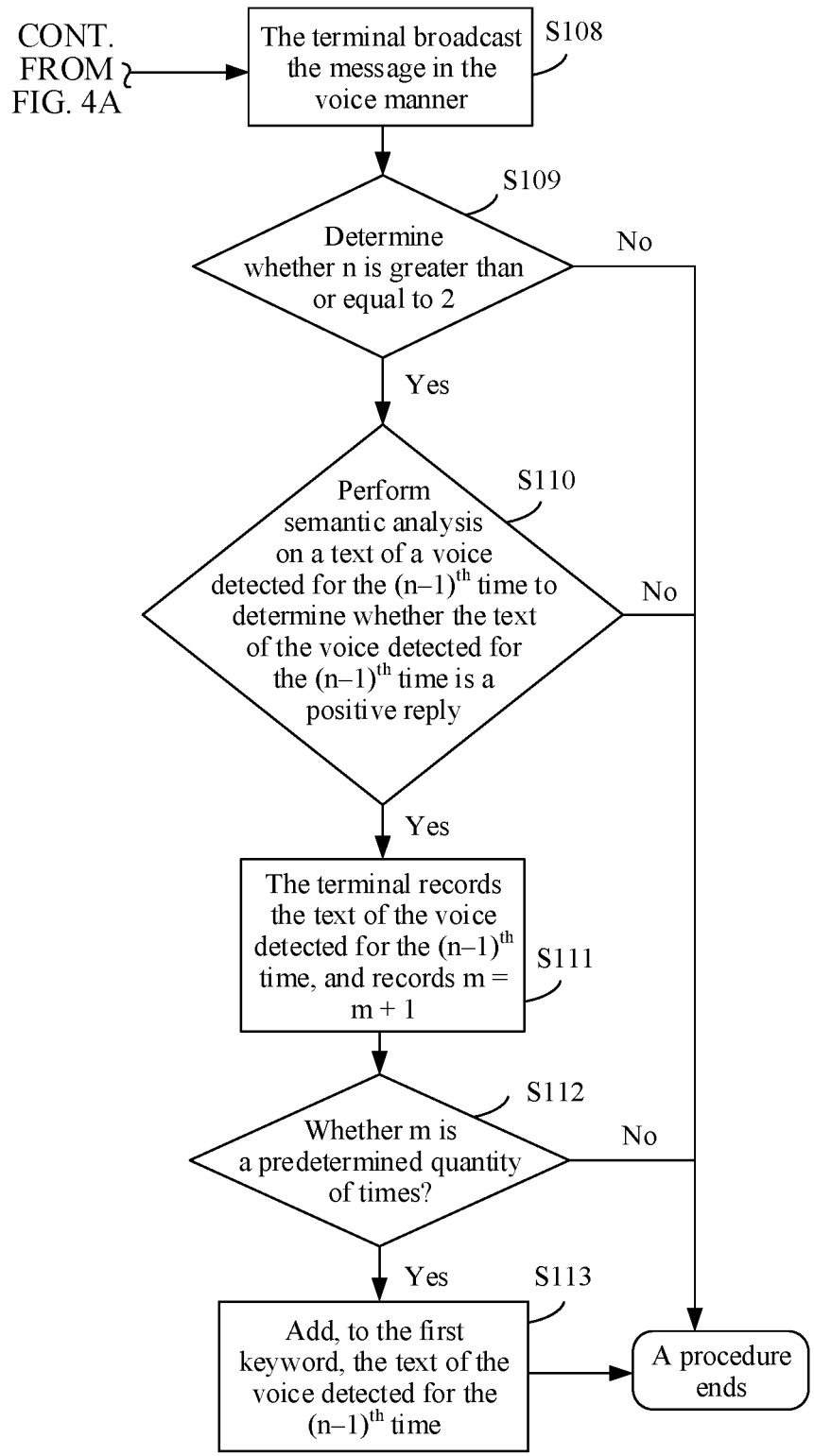

FIG. 4A and FIG. 4B are a schematic flowchart of another method for playing a message in a voice manner according to an embodiment of this application. The method specifically includes S101 to S113. S101 to S113 are as follows:

S101: A terminal newly receives a message.

S102: The terminal asks, in a voice manner, a user whether to play the message.

For example, the terminal initializes parameters, for example, n=0 and time=0 before, when, or after S102 is performed, where n is used to mark a quantity of times that the terminal detects a voice command of the user in a process from this step to end of a procedure, and time is used for timekeeping. Within a preset time period, if the terminal has not detected the voice command of the user, or a voice of the user has not been determined as a command for playing the message, the terminal ends this procedure, and considers by default that the user does not expect to play the message in the voice manner. In some embodiments of this application, the terminal may alternatively initialize time in step S101, and start timekeeping from step S101. This is not limited in this embodiment of this application.

It should be noted that m is used to mark a recorded quantity of times of learning a text of the voice in a process in which the terminal learns the voice command of the user. In some embodiments of this application, a value (m=1) of m may be initialized when the terminal records, for the first time, a voice command that needs to be learned. In some other embodiments of this application, a value (m=0) of m may be initialized when the terminal enables, for the first time, a function of playing the message in the voice manner, or when the terminal enables, for the first time, a function of learning the voice command. This is not limited in this embodiment of this application.

S103: The terminal detects a voice of the user, and records a quantity n of times that the voice of the user is detected.

It should be noted that an initial value of n in this embodiment is 0. Each time after detecting the voice of the user, the terminal updates a value of n, and increases n by 1. In specific implementation, this may be implemented by using code "n=n+1". The voice of the user detected this time is recorded as a voice of the user detected for the $n^{th}$ time.

S104: The terminal converts the voice detected for the $n^{th}$ time into a text.

S105: The terminal matches the converted text with a set first keyword. If the converted text does not match the set first keyword, step S106 is performed. If the converted text matches the set first keyword, step S108 is performed.

The first keyword set herein is a positive reply. For example, if the converted text matches a first keyword of a positive reply, it is considered that the user expects to play the message in the voice manner. If the converted text does not match the first keyword of the positive reply, the voice of the user needs to be further learned to determine whether the user expects to play the message in the voice manner.

S106: The terminal does not play the message in the voice manner temporarily.

S107: The terminal determines whether the time (time) reaches a preset time. If the time reaches the preset time, the procedure ends. If the time does not reach the preset time, step S103 continues to be performed.

S108: The terminal plays the message in the voice manner.

S109: The terminal determines whether n is greater than or equal to 2. If n is greater than or equal to 2, step S110 is performed. If n is not greater than or equal to 2, this procedure ends.

If n is not greater than or equal to 2, it indicates that after receiving the message, when sending the voice command for the first time, the user makes a reply by using the preset first keyword of the positive reply. In this case, the terminal recognizes the voice command of the user, and plays the message in the voice manner. Therefore, there is no need to learn a last voice command of the user, to be specific, the following learning process does not need to be performed, and the procedure ends.

If n is greater than or equal to 2, it indicates that after receiving the message, when sending the voice command for the second time or later time, the user makes a reply by using the preset first keyword of the positive reply. To be specific, before this, the user does not use the preset first keyword of the positive reply for at least one time when sending the voice command. Therefore, the terminal needs to learn the voice command sent for the at least one time, to determine whether the voice command sent for the at least one time is a positive reply, that is, S110 and subsequent steps are performed.

S110: The terminal performs semantic analysis on a text of a voice detected last time (namely, the $(n-1)^{th}$ time), to determine whether the text of the voice detected last time is a positive reply. If the text of the voice detected last time is the positive reply, step S111 is performed. If the text of the voice detected last time is not the positive reply, this procedure ends.

In some embodiments of this application, in this step, whether the text of the voice detected last time is the positive reply, a negative reply, or neither may be determined through the semantic analysis. This can provide more basis for the terminal to determine whether the text of the voice detected last time is the positive reply.

In some other embodiments of this application, the terminal may perform semantic analysis on texts of voices detected before this time (from the first time to the $(n-1)^{th}$ time). This is because the voices detected from the first time to the $(n-1)^{th}$ time may be different expressions that the user expects to play the message in the voice manner. In this way, a learning capability and learning efficiency of the terminal are improved.

In some still other embodiments of this application, alternatively, the terminal may directly perform S111 without performing step S110. This is not specifically limited in this embodiment of this application.

S111: The terminal records the text of the voice detected last time (namely, $(n-1)^{th}$ time), and records m=m+1.

In some other embodiments of this application, the terminal may separately record the texts of all the voices detected before this time (from the first time to the $(n-1)^{th}$ time). In this case, a text of a voice detected each time corresponds to one m value, and m corresponding to the text of the voice detected each time is increased by 1.

S112: The terminal determines whether m is a predetermined quantity of times. If m is the predetermined quantity of times, step S113 is performed. If m is not the predetermined quantity of times, this procedure ends.

In some other embodiments of this application, the terminal records the texts of the voices detected from the first time to the $(n-1)^{th}$ time. In this case, the terminal may determine, for an m value corresponding to a text of a voice detected each time, whether a quantity of times of using the m value corresponding to the text of the voice detected each time reaches the predetermined quantity of times.

S113: The terminal adds, to the first keyword, the text of the voice detected last time (namely, the $(n-1)^{th}$ time).

In some other embodiments of this application, the terminal records the texts of the voices detected from the first time to the $(n-1)^{th}$ time. In this case, the terminal may set, as the first keyword, a text of a voice detected for one or more times when a corresponding value of m meets the predetermined quantity of times.

Figure 5A:
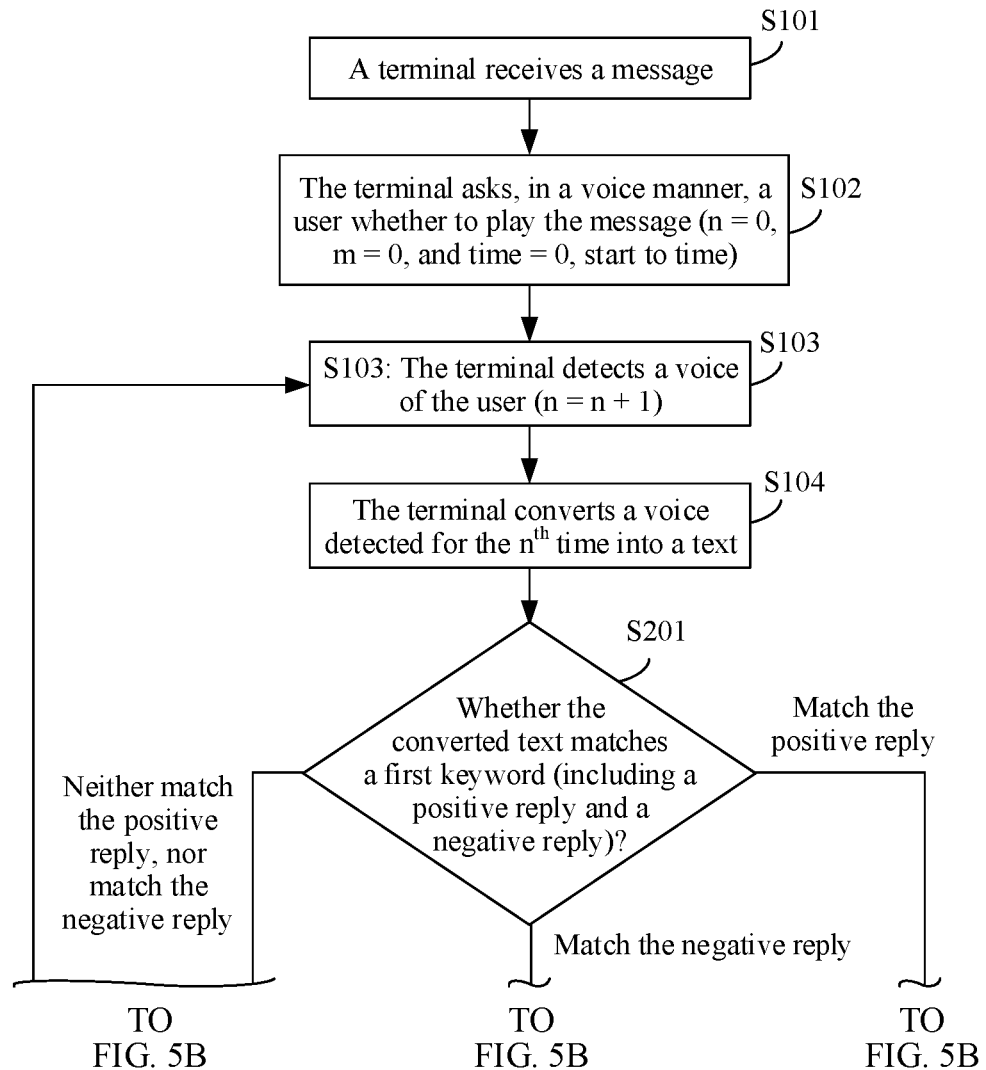
FIG. 5A to FIG. 5C are a schematic flowchart 3 of a message playing method according to an embodiment of this application.
Figure 5B:
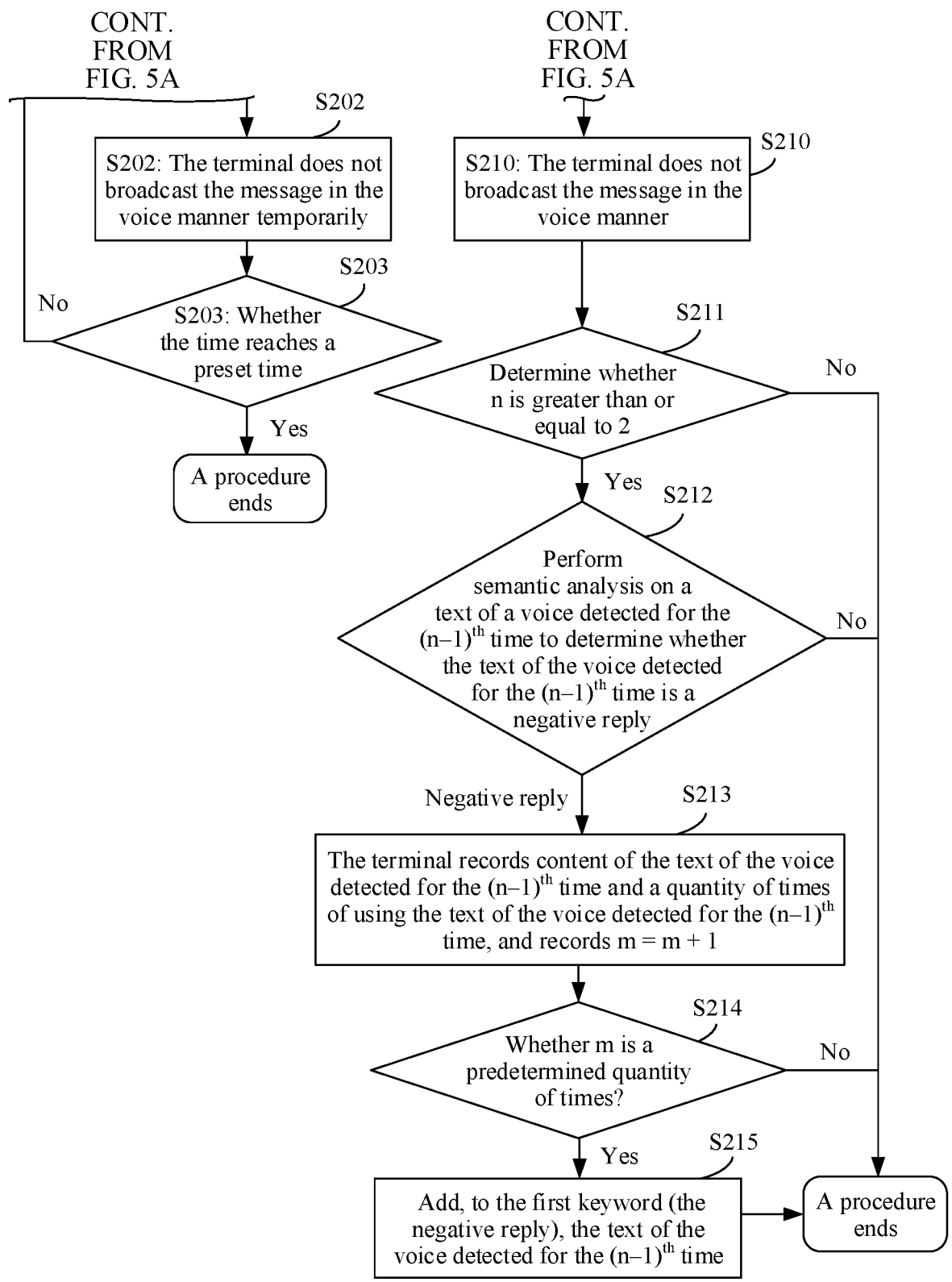
Figure 5C:
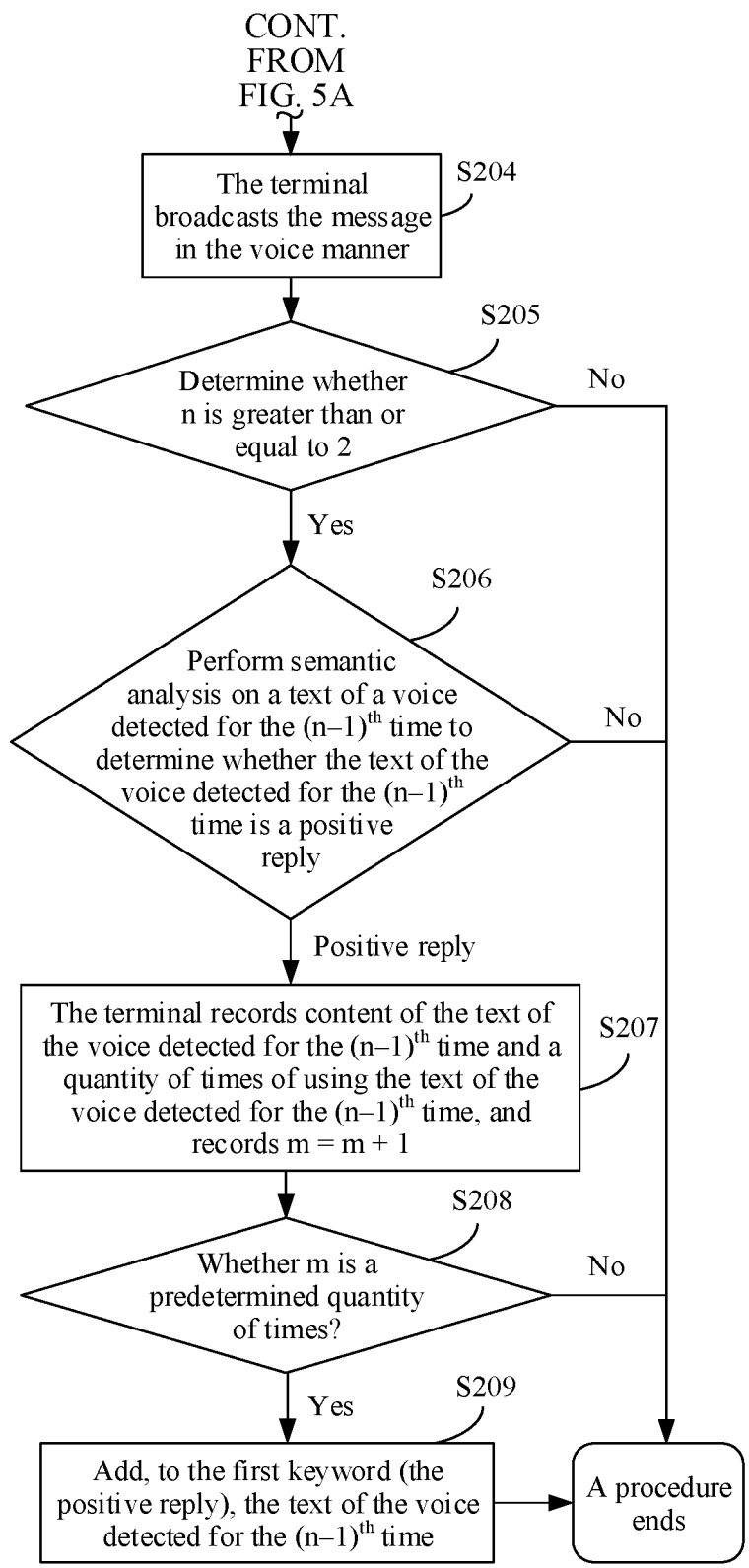

FIG. 5A to FIG. 5C are a schematic flowchart of another method for playing a message in a voice manner according to an embodiment of this application. An example in which a set first keyword includes a positive reply and a negative reply is used for description in the procedure. The procedure specifically includes steps S101 to S104 and steps S201 to S215. Steps S201 to S215 are specifically as follows:

S201: A terminal determines whether a text of a voice detected for the $n^{th}$ time matches a set key. If it is determined that the text of the voice detected for the $n^{th}$ time does not match a first keyword of a positive reply or a first keyword of a negative reply, step S202 is performed. If it is determined that the text of the voice detected for the $n^{th}$ time matches the first keyword of the positive reply, step S204 is performed. If it is determined that the text of the voice detected for the $n^{th}$ time matches the first keyword of the negative reply, step S210 is performed.

S202: The terminal does not play a message in a voice manner temporarily.

S203: The terminal determines whether a time (time) reaches a preset time. If the time reaches the preset time, the procedure ends. If the time does not reach the preset time, step S103 continues to be performed.

S204: The terminal plays the message in the voice manner.

S205: The terminal determines whether n is greater than or equal to 2. If n is greater than or equal to 2, step S206 is performed. If n is not greater than or equal to 2, this procedure ends.

S206: The terminal performs semantic analysis on a text of a voice detected for the $(n-1)^{th}$ time, to determine whether the text of the voice detected for the $(n-1)^{th}$ time is a positive reply. If the text of the voice detected for the $(n-1)^{th}$ time is the positive reply, step S207 is performed. If the text of the voice detected for the $(n-1)^{th}$ time is not the positive reply, this procedure ends.

S207: The terminal records the text of the voice detected for the $(n-1)^{th}$ time, and records m=m+1.

S208: The terminal determines whether m is a predetermined quantity of times. If m is the predetermined quantity of times, step S209 is performed. If m is not the predetermined quantity of times, this procedure ends.

S209: The terminal adds the text of the voice detected for the $(n-1)^{th}$ time to the first keyword of the positive reply.

For steps S204 to S209, refer to steps S108 to S113. Details are not described.

S210: The terminal does not play the message in the voice manner.

S211: The terminal determines whether n is greater than or equal to 2. If n is greater than or equal to 2, step S212 is performed. If n is not greater than or equal to 2, this procedure ends.

S212: The terminal performs semantic analysis on a text of a voice detected for the $(n-1)^{th}$ time, to determine whether the text of the voice detected for the $(n-1)^{th}$ time is a positive reply. If the text of the voice detected for the $(n-1)^{th}$ time is the positive reply, step S213 is performed. If the text of the voice detected for the $(n-1)^{th}$ time is not the positive reply, this procedure ends.

In some embodiments, in this step, whether the text of the voice detected for the $(n-1)^{th}$ time is the positive reply, a negative reply, or neither may be determined through the voice analysis. This can provide more basis for the terminal to determine whether the text of the voice detected for the $(n-1)^{th}$ time is the negative reply.

In some other embodiments, the terminal may perform semantic analysis on texts of voices detected before this time (from the first time to the $(n-1)^{th}$ time). This is because the voices detected from the first time to the $(n-1)^{th}$ time may be different expressions that a user expects not to play the message in the voice manner. In this way, a learning capability and learning efficiency of the terminal are improved.

In some still other embodiments, the terminal may directly perform S213 without performing this step. This is not specifically limited in this embodiment of this application.

S213: The terminal records the text of the voice detected for the $(n-1)^{th}$ time, and records m=m+1.

In some other embodiments, the terminal may separately record texts of voices detected before this time (from the first time to the $(n-1)^{th}$ time). In this case, a text of a voice detected each time corresponds to one m value, and m corresponding to the text of the voice detected each time is increased by 1.

S214: The terminal determines whether m is the predetermined quantity of times. If m is the predetermined quantity of times, step S215 is performed. If m is not the predetermined quantity of times, this procedure ends.

In some other embodiments, the terminal separately records texts of voices detected from the first time to the $(n-1)^{th}$ time. In this case, the terminal may determine, for an m value corresponding to a text of a voice detected each time, whether a quantity of times of using the m value corresponding to the text of the voice detected each time reaches the predetermined quantity of times.

S215: The terminal adds the text of the voice detected for the $(n-1)^{th}$ time to the first keyword of the negative reply.

In some other embodiments, the terminal separately records texts of voices detected from the first time to the $(n-1)^{th}$ time. In this case, the terminal may set, as the first keyword, a text of a voice detected for one or more times when a corresponding value of m meets the predetermined quantity of times. This procedure ends.

It can be learned from the foregoing that, in the voice playing method provided in this embodiment of this application, when the voice command of the user is not a preset command, the terminal may learn the voice command of the user, to recognize an intention of the user and perform a corresponding operation. In this way, interaction between the user and the terminal is more personalized and intelligent. This helps improve use efficiency of the terminal and improve user experience.

In a second application scenario, a terminal automatically plays a newly received message in a voice manner.

Figure 6:
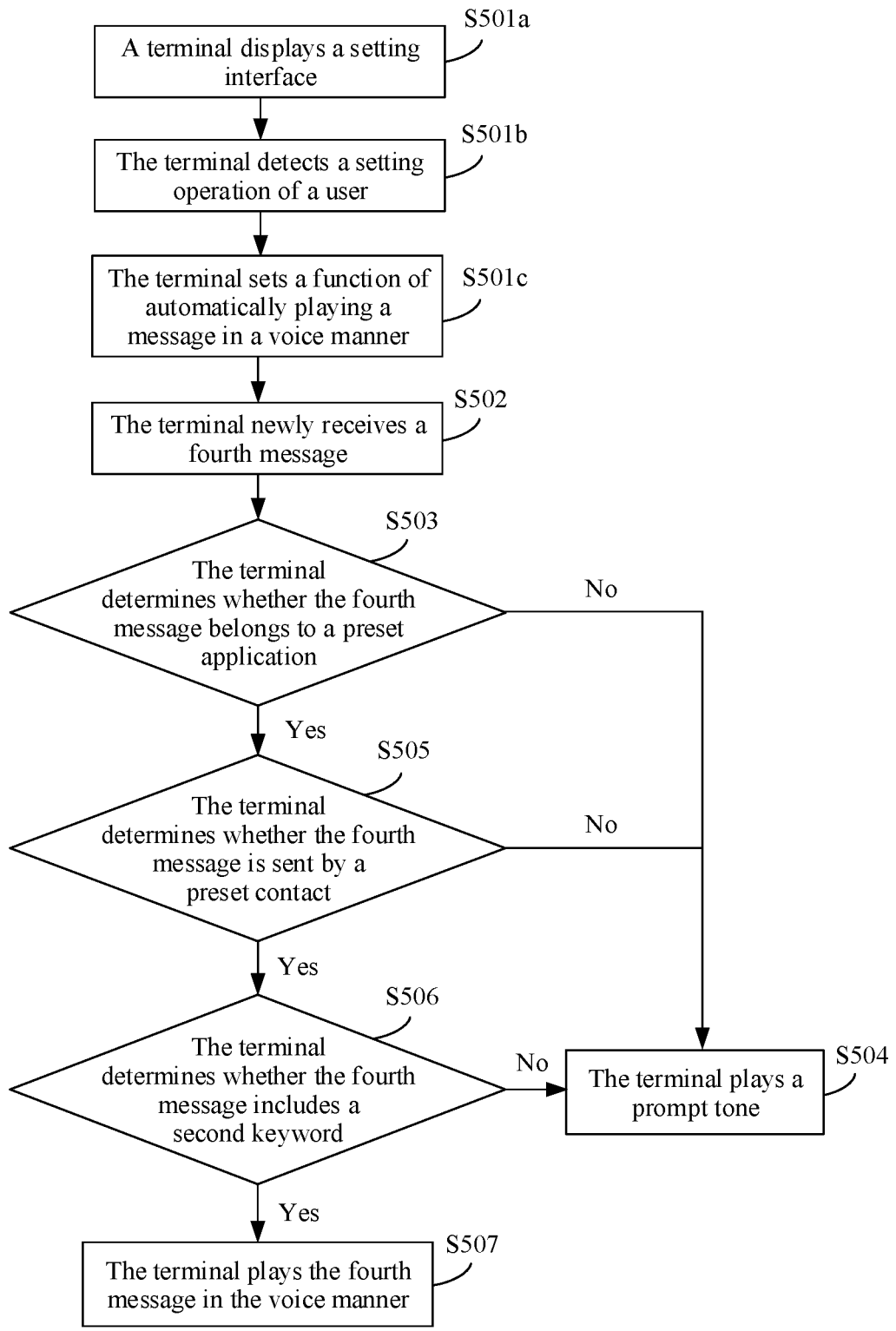
FIG. 6 is a schematic flowchart 4 of a message playing method according to an embodiment of this application.

FIG. 6 is a schematic flowchart of a method for playing a message in a voice manner according to an embodiment of this application. The method includes steps S501a to S505, and steps S501a to S505 are specifically as follows:

S501a: A terminal displays a setting interface.

S501b: The terminal detects a setting operation of a user.

S501c: In response to the setting operation of the user, the terminal sets a function of automatically playing a message in a voice manner.

In some embodiments, the user may set the message automatically played by the terminal. For example, the terminal may set an application (namely, a preset application) for automatically playing the message. In this case, when receiving the message from the preset application, the terminal may automatically play the message. Alternatively, the terminal may set a contact (namely, a preset contact) corresponding to the automatically played message, or a group (namely, a preset contact group) of a contact corresponding to the automatically played message. In this case, when receiving the message sent by the preset contact or the preset contact group, the terminal may automatically play the message in the voice manner. Alternatively, the terminal may set a second keyword (a preset second keyword) included in content of the automatically played message. In this case, when the message received by the terminal includes the preset second keyword, the terminal automatically plays the message. Similarly, the terminal may alternatively set a type (for example, a chat message, a Moments message, and a system message in WeChat) of the automatically played message, a time period of the automatically played message, a location of the automatically played message, or the like. Details are not described in this embodiment of this application.

In some other embodiments, the terminal may alternatively set a playing priority of the message. Specifically, the user may determine the playing priority of the message based on a usage frequency of each application, importance of each contact or contact group, or specific setting content of the second keyword. For example, if the user uses WeChat more frequently, a priority of WeChat may be set to be higher than a priority of Messages. For another example, a priority of a starred contact in WeChat is set to be higher than a priority of a common contact in WeChat. For another example, if the second keyword is set to "urgent", a message priority including the second keyword may be set to the highest. This is not specifically limited in this embodiment of this application.

Figure 7:
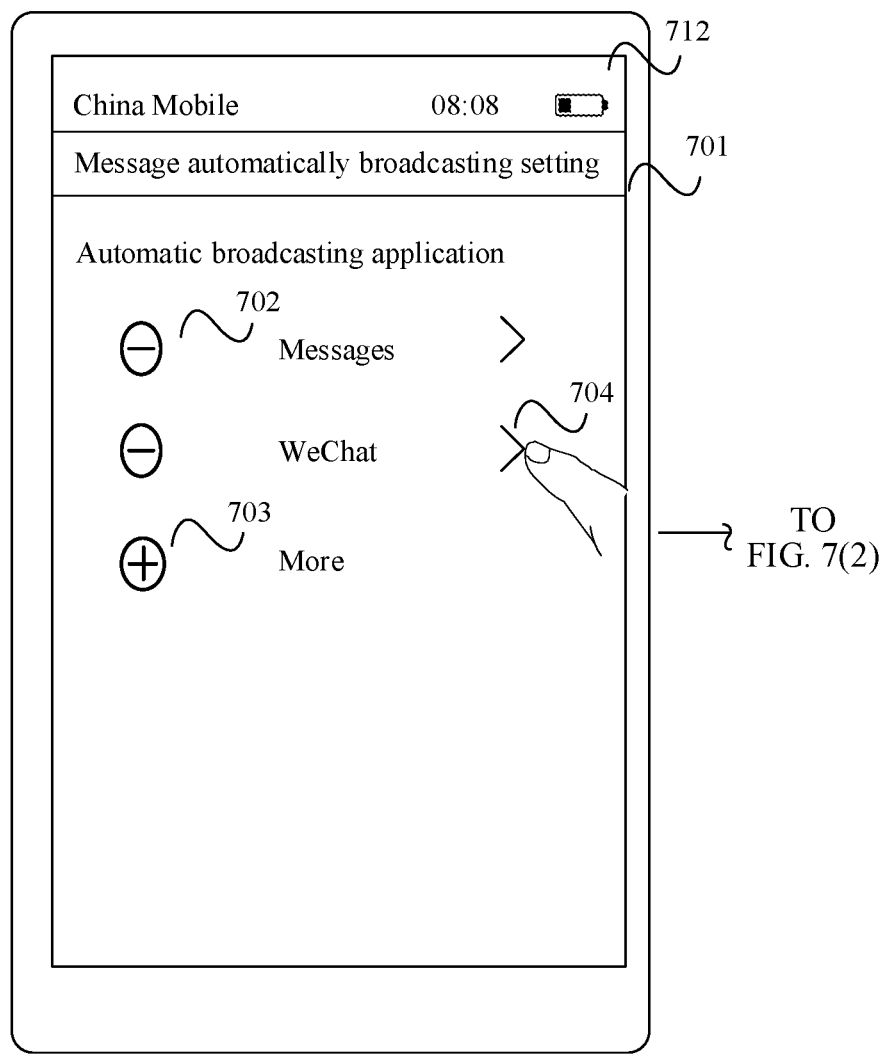
FIG. 7(1) to FIG. 7(4) are a schematic diagram of some terminal interfaces according to an embodiment of this application.
Figure 7:
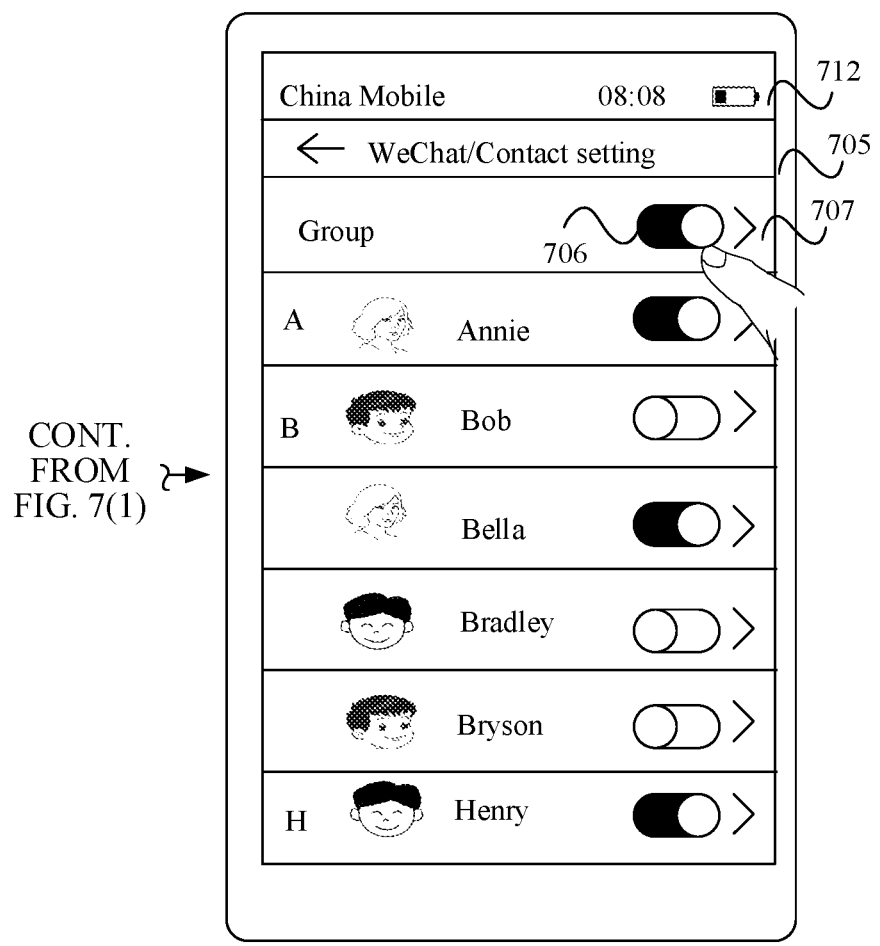
Figure 7:
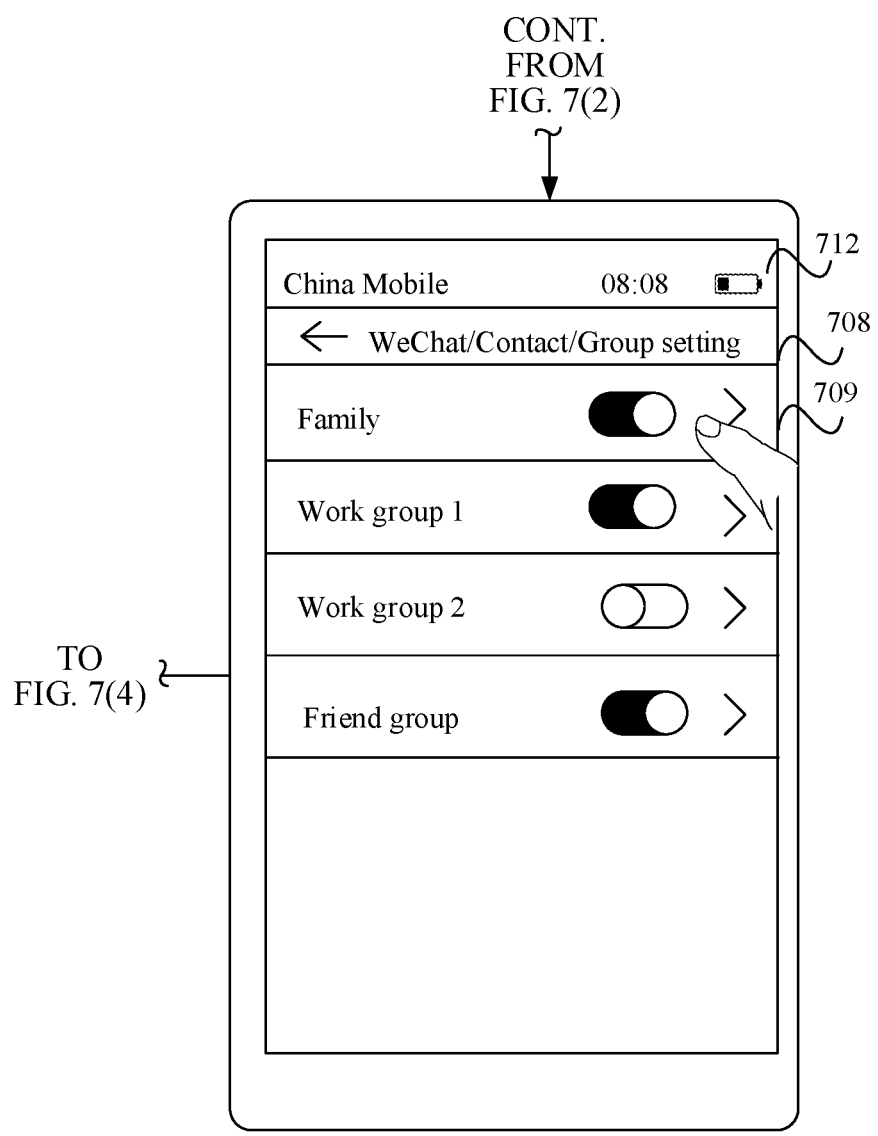
Figure 7:
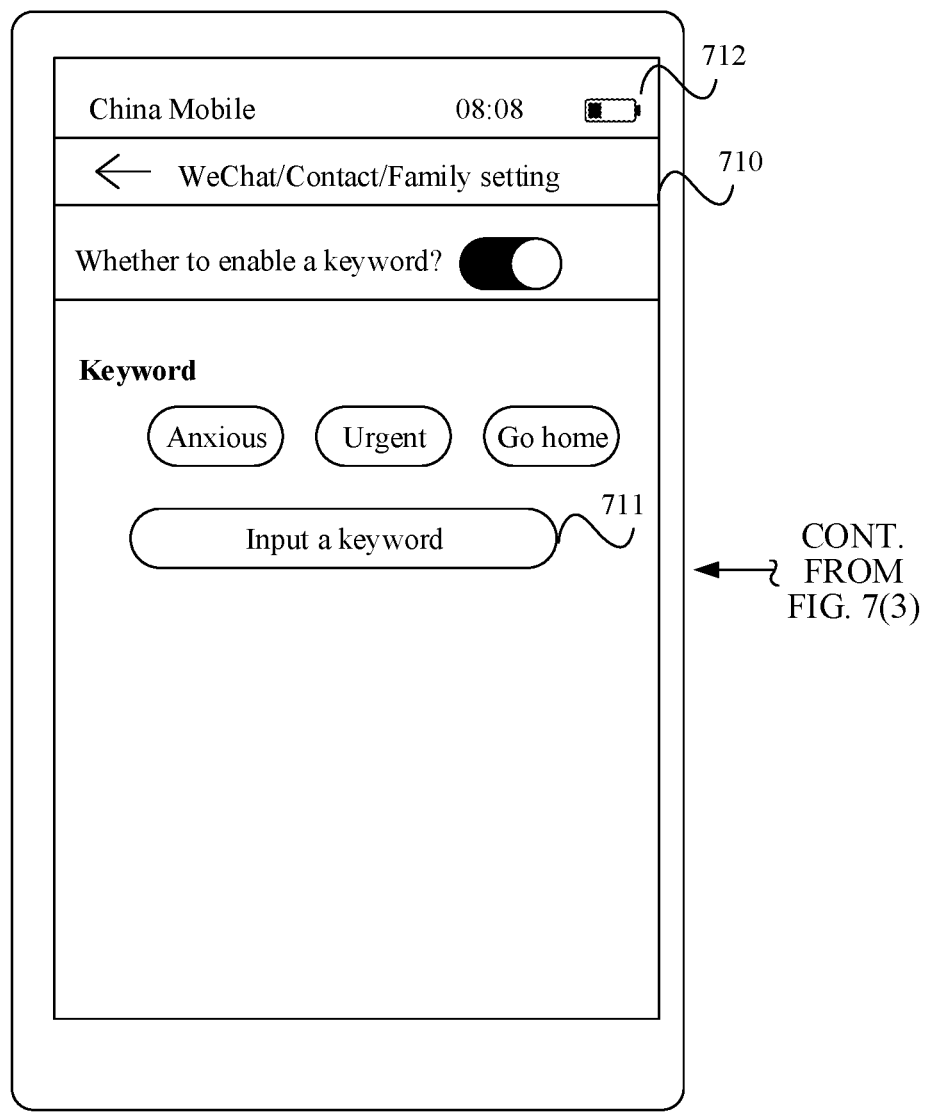

For example, FIG. 7(1) to FIG. 7(4) are a schematic diagram of some interfaces of a terminal. An interface 701 shown in FIG. 7(1) may be used to set an application that can automatically play a message. The interface 701 may include a status bar 712, a plurality of controls 702, a plurality of controls 703, and a control 704. The status bar 712 may include a name of an operator (for example, China Mobile), a time, a WiFi icon, signal strength, current remaining power, and the like. The control 702 may be used to delete the application for automatically playing a message, the control 703 may be used to add the application for automatically playing a message, and the control 704 may be used to further set a selected application. For example, when the terminal receives an operation performed by the user on tapping the control 704 corresponding to "WeChat", for example, a tapping operation, the terminal displays an interface 705 shown in FIG. 7(2). The interface 705 may be used to set a contact in "WeChat". Contact settings include a group setting and a specific contact setting. Herein, the group setting is used as an example for description. A control 706 may be used to enable a function of automatically playing a message in a group in contacts. To be specific, the terminal may set the group to automatically play a message. A control 707 is used to further set of the selected group. For example, when the terminal receives an operation performed by the user on the control 707 corresponding to the group, for example, tapping, the terminal displays an interface 708 shown in FIG. 7(3). On the interface 708, the user may select the group to automatically play a message, and specifically set the selected group. For example, when the terminal receives an operation performed by the user on a control 709 corresponding to "family", for example, tapping, the terminal displays an interface 710 shown in FIG. 7(4). On the interface 710, a function of whether to enable a keyword may be enabled. After the function of enabling a keyword is enabled, if content of a message includes the keyword, it may be considered that the message needs to be automatically played. A control 711 may be used to receive a keyword input by the user. In some other embodiments of this application, the function of enabling a keyword may not be associated with an application or a contact. To be specific, the terminal may alternatively be set to automatically play content of a message if the content of the message includes some keywords. This is irrelevant to an application to which the message belongs and whether the message is sent by a contact. This is not specifically limited in this embodiment of this application.

S502: The terminal receives a fourth message.

S503: The terminal determines whether the fourth message belongs to the preset application. If the fourth message belongs to the preset application, step S505 is performed. If the fourth message does not belong to the preset application, step S504 is performed.

S504: The terminal plays a prompt tone, to notify the user that the fourth message is received.

This procedure ends.

S505: The terminal determines whether the fourth message is sent by the preset contact. If the fourth message is sent by the preset contact, step S506 is performed. If the fourth message is not sent by the preset contact, step S504 is performed.

S506: The terminal determines whether content of the fourth message includes the second keyword. If the content of the fourth message includes the second keyword, step S507 is performed. If the content of the fourth message does not include the second keyword, step S504 is performed.

It should be noted that an execution sequence of steps S503 and S504 and specific determining content in the steps are not limited in this embodiment of this application. A specific determining process and specific determining content of the terminal are related to a specific setting of the user in step S501. This is not specifically limited in this embodiment of this application.

S507: The terminal plays the fourth message in the voice manner.

In some embodiments, before this step, the terminal may alternatively ask, in the voice manner, the user whether to play the fourth message. For an inquiry process, refer to related content in the application scenario 1. Details are not described herein.

In the first application scenario and the second application scenario, in some embodiments, to ensure privacy of user information, before the terminal plays a message (for example, the first message or the fourth message) in the voice manner, the terminal may further receive a setting of the user about whether to enable a voice playing function. If the user enables the voice playing function, the terminal has permission to play a message in the voice manner, and may play the message in the voice manner when a condition is met. If the user does not enable the voice playing function, the terminal does not have the permission to play a message in the voice manner, and cannot play the message in the voice manner.

In the first application scenario and the second application scenario, in some other embodiments, after the terminal plays a message (for example, the first message or the fourth message), the terminal may further receive a voice command of the user, and answer the message. In this case, the voice command of the user may use a third keyword as a prefix of a voice, to recognize that the voice of the user is an answer of the user to the message. For example, the third keyword may be "please answer", "please reply", or the like.

For example, after playing the first message or the fourth message, the terminal receives a fourth voice of the user. The terminal converts the fourth voice into text information. When it is determined, based on the text information, that the fourth voice starts with the third keyword, it is determined that the fourth voice is an answer of the user to the first message or the fourth message.

In this case, the terminal answers, to a contact that sends the message, voice information following the third keyword in the fourth voice. Optionally, the terminal may alternatively convert the voice information following the third keyword in the fourth voice into text information, and answer the text information to the contact that sends the message. This is not specifically limited in this embodiment of this application.

It should be noted that in some embodiments, after receiving the fourth voice, the terminal may convert the fourth voice into the text information. Optionally, when receiving the fourth voice, the terminal may convert a part of the received fourth voice into text information. When it is determined that a prefix of the fourth voice is the third keyword, it is determined that the fourth voice is an answer of the user, and subsequent steps continue to be performed. When it is determined that the prefix of the fourth voice is not the third keyword, it is determined that the fourth voice is not an answer of the user, and subsequent steps may not be performed. In this way, processing load of the terminal is reduced, and a processing capability of the terminal is improved.

In some embodiments, the terminal may learn the third keyword. A learning method is similar to a method for learning the first keyword by the terminal in the application scenario 1. Details are not described herein.

In some other embodiments, the terminal may answer to a sender with some pictures (for example, a smiling face picture or an angry face picture in an input method) based on a voice of the user. The user may preset a correspondence between a fourth keyword and a picture in the input method. For example, "smile" corresponds to the smiling face picture, and "anger" corresponds to the angry face picture. In this way, when the terminal has determined that the fourth voice is an answer of the user to the first message or the fourth message, and detects that the fourth voice of the user includes the fourth keyword, the terminal answers a corresponding picture to the sender according to the correspondence between the fourth keyword and the picture. In this way, diversity of answered messages of the user is enriched, and user experience is improved.

In still other embodiments, when receiving the message, the terminal may alternatively perform natural semantic analysis on content of the message. The terminal may invoke a related application module or functional module based on a result of the natural semantic analysis, and provide more related information for the user in a voice playing manner. For example, the content of the message is "I am going to your place on business tomorrow. How is the weather over there?" The terminal performs semantic analysis on inquiry about the weather, and may invoke a weather-related application in the terminal, to obtain weather information from the weather-related application, and play the weather information to the user. For another example, the content of the message is "Where to eat today?" The terminal performs natural semantic analysis on inquiry about a restaurant. In this case, the terminal may invoke a map to ask a restaurant near the terminal, or the terminal may invoke, for example, a Dazhong Dianping application, to ask information, for example, a restaurant that the user frequently goes to, and play the information to the user. In this way, interaction between the user and the terminal is more efficient, and user experience is improved.

The foregoing descriptions are merely implementations of various embodiments in accordance with the disclosure, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A message playing method of a terminal, comprises:
   receiving a first message, wherein the first message is text information;
   in response to receiving the first message, playing a first voice asking a user whether to play the first message in a voice manner;
   detecting a second voice of the user;
   converting the second voice into a first text;

continuing to detect a voice of the user, when the first text does not match a first keyword, wherein the first keyword is a positive keyword;

converting a third voice into a second text when the terminal detects the third voice of the user;

playing the first message in the voice manner when the second text matches the first keyword, recording a quantity of times of the first text is used; and adding the first text to the first keyword, if the quantity of times of the first text being used is greater than a first threshold.

2. The method of claim 1, wherein the method further comprises:
converting the first message into a fourth voice; and
playing the fourth voice.

3. The method of claim 1, wherein the method further comprises:
receiving a second message, wherein the second message is text information;
in response to receiving the second message, playing a fifth voice asking the user whether to play the second message in the voice manner;
detecting a sixth voice of the user;
converting the sixth voice into a third text; and
playing the second message in the voice manner, when the third text matches the first keyword.

4. The method of claim 1, wherein the method further comprises:
playing the first voice, when the first message belongs to a preset application, a sender of the first message belongs to a preset contact group, or the first message comprises a second keyword.

5. The method of claim 1, wherein the method further comprises:
displaying prompt information, wherein the prompt information notifying the user that the first keyword has been updated.

6. The method of claim 1, wherein the method further comprises:
determining not to play the first message in the voice manner, if the terminal detects, within a preset time period, that a quantity of times of using the voice that is of the user and that does not match the first keyword is greater than a second threshold.

7. The method of claim 1, wherein the first message is a message of an instant communication application.

8. A message playing method of a terminal, comprises:
receiving a first message, wherein the first message is text information;
in response to receiving the first message, playing a first voice asking a user whether to play the first message in a voice manner;
detecting a second voice of the user;
converting the second voice into a first text;
continuing to detect a voice of the user, when the first text does not match a first keyword, wherein the first keyword comprises a positive keyword or a negative keyword;
converting a third voice into a second text when the terminal detects the third voice of the user;
playing the first message in the voice manner, and recording a quantity of times of the first text is used, when the second text matches the positive keyword;
adding the first text to the positive keyword, when the quantity of times of the first text being used is greater than a first threshold;
determining not to play the first message in the voice manner, and recording a quantity of times of the first text being used, when the second text matches the negative keyword; and
adding the first text to the negative keyword, when the quantity of times of the first text being used is greater than a first threshold.

9. The method of claim 8, wherein the method further comprises:
receiving a second message, wherein the second message is text information;
in response to receiving the second message, playing a fourth voice asking the user whether to play the second message in the voice manner;
detecting a fifth voice of the user;
converting the fifth voice into a third text;
playing the second message in the voice manner, when the third text matches an added positive keyword; and
determining not to play the second message in the voice manner, when the third text matches an added negative keyword.

10. The method of claim 8, wherein the method further comprises:
playing the first voice, when the first message belongs to a preset application, a sender of the first message belongs to a preset contact group, or the first message comprises a second keyword.

11. The method of claim 8, wherein the method further comprises:
displaying prompt information, wherein the prompt information notifying the user that the first keyword has been updated.

12. The method of claim 8, wherein the method further comprises:
determining not to play the first message in the voice manner, when the terminal has not detected the voice of the user within a preset time period.

13. The method of claim 8, wherein the method further comprises:
determining not to play the first message in the voice manner, when the terminal has not detected the voice that is of the user and that matches the first keyword within a preset time period.

14. A terminal, comprising:
a touchscreen;
a non-transitory memory comprising instructions; and
a processor coupled to the non-transitory memory, wherein the instructions, when executed by the processor, cause the terminal to:
receive a first message, wherein the first message is text information;
in response to receiving the first message, playing a first voice asking a user whether to play the first message in a voice manner;
detect a second voice of the user;
convert the second voice into a first text;
continue to detect a voice of the user, when the first text does not match a first keyword, wherein the first keyword is a positive keyword;
convert a third voice into a second text when the terminal detects the third voice of the user;
play the first message in the voice manner when the second text matches the first keyword,
record a quantity of times of the first text is used; and
add the first text to the first keyword, if the quantity of times of the first text being used is greater than a first threshold.

15. The terminal of claim 14, wherein the computer-executable instructions further cause the intelligent device to:
- convert the first message into a fourth voice; and
- play the fourth voice.

16. The terminal of claim 14, wherein the computer-executable instructions further cause the intelligent device to:
- receive a second message, wherein the second message is text information;
- in response to receiving the second message, play a fifth voice asking the user whether to play the second message in the voice manner;
- detect a sixth voice of the user;
- convert the sixth voice into a third text; and
- play the second message in the voice manner, when the third text matches an added first keyword.

17. The terminal of claim 14, wherein the computer-executable instructions further cause the intelligent device to:
- play the first voice, when the first message belongs to a preset application, a sender of the first message belongs to a preset contact group, or the first message comprises a second keyword.

18. The terminal of claim 14, wherein the computer-executable instructions further cause the intelligent device to:
- display prompt information notifying the user that the first keyword has been updated.

19. The terminal of claim 14, wherein the computer-executable instructions further cause the intelligent device to:
- determine not to play the first message in the voice manner, if the terminal detects, within a preset time period, that a quantity of times of using the voice that is of the user and that does not match the first keyword is greater than a second threshold.

20. The terminal of claim 14, wherein the first message is a message of an instant communication application.

* * * * *